US012738674B2

(12) United States Patent
Katayama et al.

(10) Patent No.: US 12,738,674 B2
(45) Date of Patent: Sep. 15, 2026

(54) SYSTEM, PORTABLE ELECTRONIC DEVICE, PROCESSING METHOD, AND NON-TRANSITORY COMPUTER-READABLE STORAGE MEDIUM

(71) Applicant: NINTENDO CO., LTD., Kyoto (JP)

(72) Inventors: Mitsuru Katayama, Kyoto (JP); Hiroyuki Takeuchi, Kyoto (JP); Yuta Fujita, Kyoto (JP); Yoshitaka Nakano, Kyoto (JP); Keisuke Seko, Kyoto (JP); Tatsuya Ajimizu, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 299 days.

(21) Appl. No.: 18/765,153

(22) Filed: Jul. 5, 2024

(65) Prior Publication Data

US 2024/0364024 A1 Oct. 31, 2024

Related U.S. Application Data

(63) Continuation of application No. PCT/JP2022/006690, filed on Feb. 18, 2022.

(51) Int. Cl.
*A63F 13/26* (2014.01)
*A63F 13/92* (2014.01)
(Continued)

(52) U.S. Cl.
CPC ............. *H01Q 21/29* (2013.01); *A63F 13/26* (2014.09); *A63F 13/92* (2014.09); *A63F 13/98* (2014.09);
(Continued)

(58) Field of Classification Search
CPC .......... A63F 13/25; A63F 13/26; A63F 13/27; A63F 13/92; A63F 13/211; A63F 13/235; A63F 13/5255; A63F 2300/1006
See application file for complete search history.

(56) References Cited

U.S. PATENT DOCUMENTS 8,447,070 B1 * 5/2013 Bozarth .................. A63F 13/31 382/103
8,456,381 B2 * 6/2013 Pering .................. G06F 3/1423 345/2.3
(Continued)

FOREIGN PATENT DOCUMENTS

CN 104272660 A * 1/2015 ........... H04L 57/131
CN 111870950 A * 11/2020 ............ A63F 13/52
(Continued)

OTHER PUBLICATIONS

International Search Report for PCT/JP2022/006690 dated May 17, 2022, 6 pages.

*Primary Examiner* — Steven J Hylinski
(74) *Attorney, Agent, or Firm* — Nixon & Vanderhye PC

(57) ABSTRACT

A system includes a portable electronic device including a display and an interface for output of an image to an external display separate from the display, a controller to receive a user operation, one or more processors, and one or more memories to store instructions that, when executed by the one or more processors, cause the one or more processors to perform generating an image in accordance with the user operation onto the controller and obtaining a direction in which the controller is present with respect to the portable electronic device. The generating the image includes generating the image based on the obtained direction when the image is outputted to the display and restricting generation of the image based on the obtained direction when the image is outputted to the external display.

18 Claims, 18 Drawing Sheets

(51) Int. Cl.
*A63F 13/98* (2014.01)
*H01Q 1/27* (2006.01)
*H01Q 21/29* (2006.01)

(52) U.S. Cl.
CPC ...... *H01Q 1/273* (2013.01); *A63F 2300/1006* (2013.01)

(56) References Cited

U.S. PATENT DOCUMENTS

| | | | | |
|---|---|---|---|---|
| 8,910,309 | B2 * | 12/2014 | Harrison .......... | H04N 21/41415 726/30 |
| 8,983,539 | B1 * | 3/2015 | Kim ....................... | H04B 1/385 455/418 |
| 8,992,317 | B2 * | 3/2015 | Ito ......................... | A63F 13/235 463/31 |
| 9,239,648 | B2 * | 1/2016 | Smus .................. | G06F 3/04883 |
| 9,256,299 | B2 * | 2/2016 | Suggs ................... | G06F 3/0346 |
| 9,298,362 | B2 * | 3/2016 | Lucero ............... | H04N 21/4126 |
| 9,417,835 | B2 * | 8/2016 | Tait ....................... | G06F 3/1446 |
| 9,684,434 | B2 * | 6/2017 | Lewin ................... | G06F 3/0484 |
| 10,609,308 | B2 * | 3/2020 | Osman ................. | H04N 5/2621 |
| 10,684,813 | B2 * | 6/2020 | Kim ...................... | G06F 3/0481 |
| 10,918,944 | B2 * | 2/2021 | Suzuki .................. | A63F 13/211 |
| 2002/0165028 | A1 * | 11/2002 | Miyamoto .............. | A63F 13/26 463/47 |
| 2003/0216176 | A1 * | 11/2003 | Shimizu .................. | A63F 13/92 463/31 |
| 2006/0038833 | A1 * | 2/2006 | Mallinson ............. | G06F 1/1686 345/633 |
| 2006/0156249 | A1 * | 7/2006 | Blythe .................. | G06F 3/0481 715/781 |
| 2008/0174551 | A1 * | 7/2008 | Ishibashi .......... | H04N 21/42204 345/158 |
| 2009/0036213 | A1 * | 2/2009 | Masuyama ........... | A63F 13/211 463/43 |
| 2010/0053164 | A1 * | 3/2010 | Imai ........................ | G06F 3/147 345/1.3 |
| 2010/0113148 | A1 * | 5/2010 | Haltovsky ............... | A63F 13/34 463/30 |
| 2011/0242134 | A1 * | 10/2011 | Miller ..................... | G06F 3/017 345/633 |
| 2012/0014558 | A1 * | 1/2012 | Stafford ................ | A63F 13/213 382/103 |
| 2012/0236210 | A1 * | 9/2012 | Matsubayashi .... | H04N 21/4312 348/739 |
| 2012/0309537 | A1 * | 12/2012 | Nogami .................. | A63F 13/26 345/682 |
| 2012/0330600 | A1 * | 12/2012 | Kuo ...................... | G01S 5/0278 702/150 |
| 2013/0181948 | A1 | 7/2013 | Sakai | |
| 2015/0352437 | A1 | 12/2015 | Koseki et al. | |
| 2016/0231872 | A1 | 8/2016 | Tamura et al. | |
| 2016/0361641 | A1 | 12/2016 | Koizumi et al. | |
| 2017/0209786 | A1 * | 7/2017 | Zhu ......................... | A63F 13/26 |
| 2018/0133602 | A1 | 5/2018 | Miwa et al. | |
| 2018/0250584 | A1 | 9/2018 | Obayashi et al. | |

FOREIGN PATENT DOCUMENTS

| | | | |
|---|---|---|---|
| JP | 2008181199 | A | 8/2008 |
| JP | 2013145463 | A | 7/2013 |
| JP | 2015232783 | A | 12/2015 |
| JP | 2017148100 | A | 8/2017 |
| JP | 2018081552 | A | 5/2018 |
| JP | 2018143261 | A | 9/2018 |
| JP | 2019181074 | A | 10/2019 |
| JP | 2019197585 | A | 11/2019 |
| WO | 2015049931 | A1 | 4/2015 |

* cited by examiner

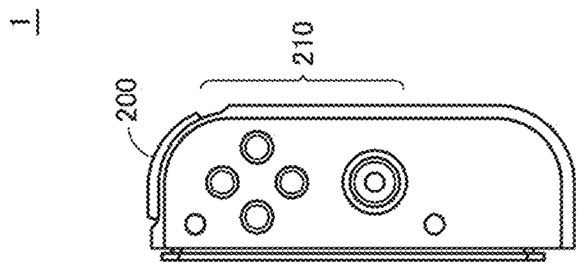
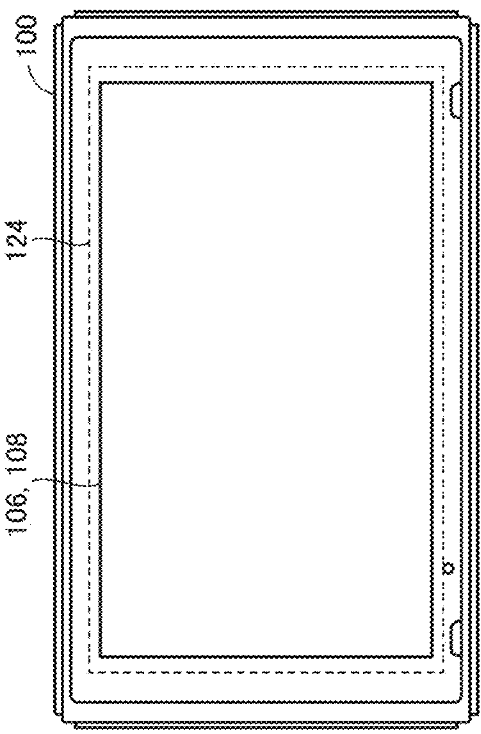
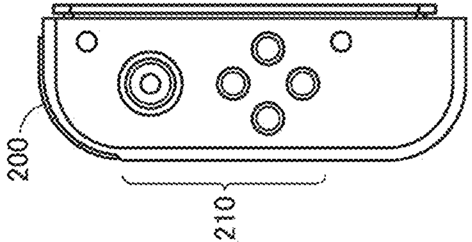
FIG.1

Figure 3:
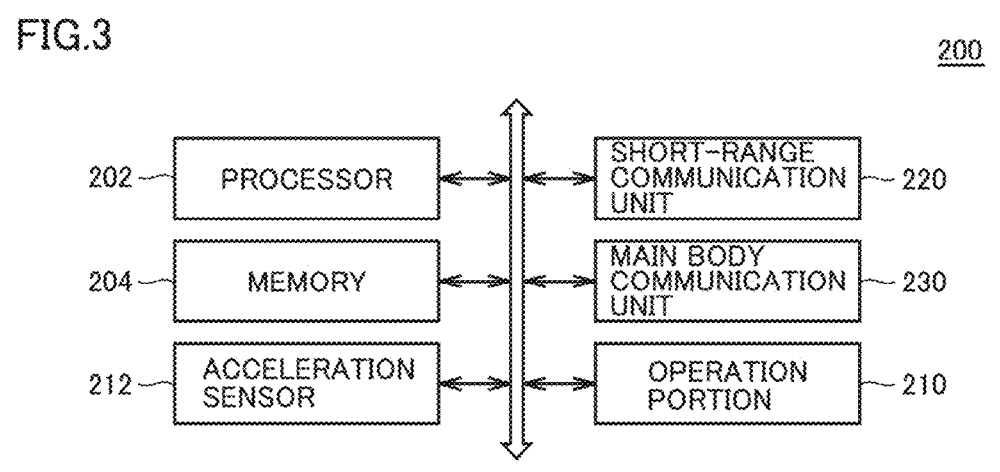

202 PROCESSOR
204 MEMORY
212 ACCELERATION SENSOR
220 SHORT-RANGE COMMUNICATION UNIT
230 MAIN BODY COMMUNICATION UNIT
210 OPERATION PORTION

FIG.4
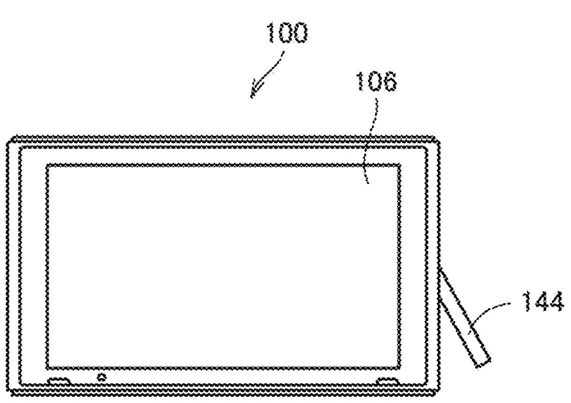
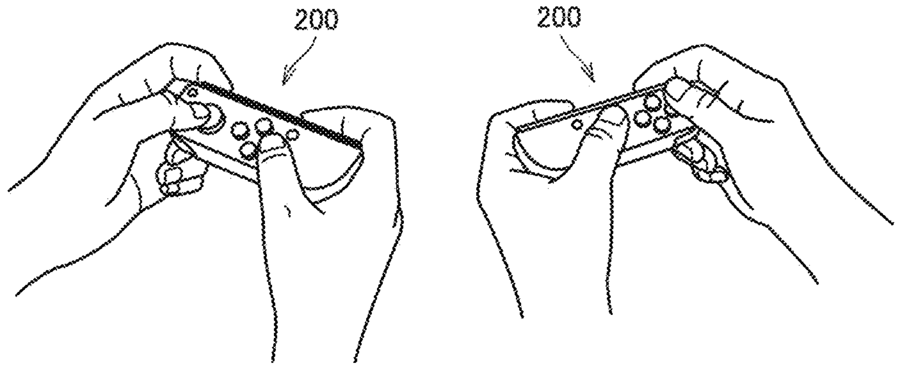

124
X
Y
200
θy
θx
125-11
125-12
125-13
125-14
125-21
125-22
125-23
125-24
125-31
125-32
125-33
125-34
125-41
125-42
125-43
125-44

120
ANTENNA ELEMENT 1
ANTENNA ELEMENT 2
ANTENNA ELEMENT 3
ANTENNA ELEMENT N
MUX
1221
DETECTOR
1222
D
1224
1223
PHASE DIFFERENCE
ANGLE CALCULATOR
1225
d, λ
ANGLE
CONTROL UNIT
1226
DECODER
1227
FRAME
MEASUREMENT RESULT
122
SELECTION COMMAND

FIG.14
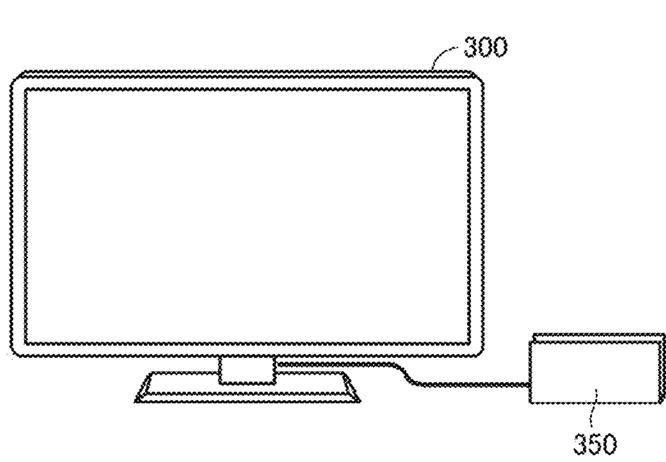
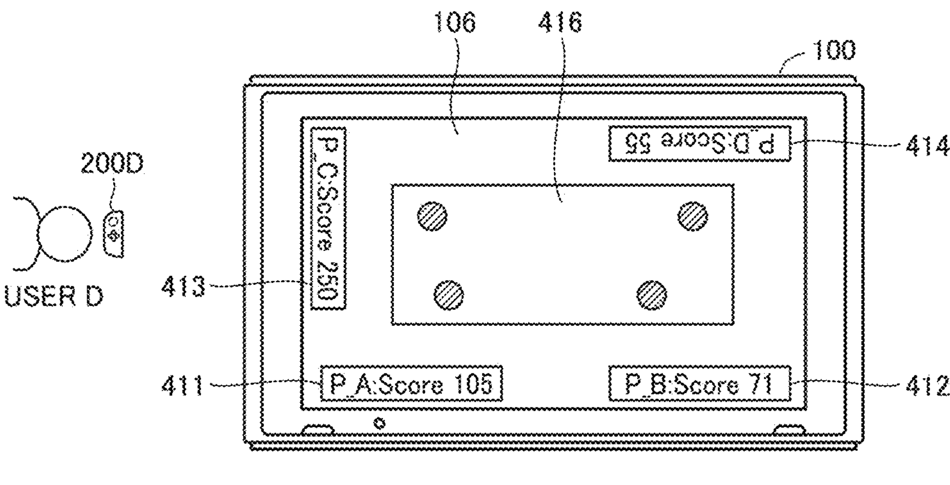
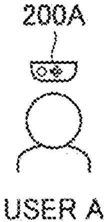
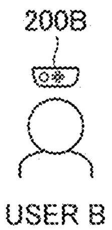

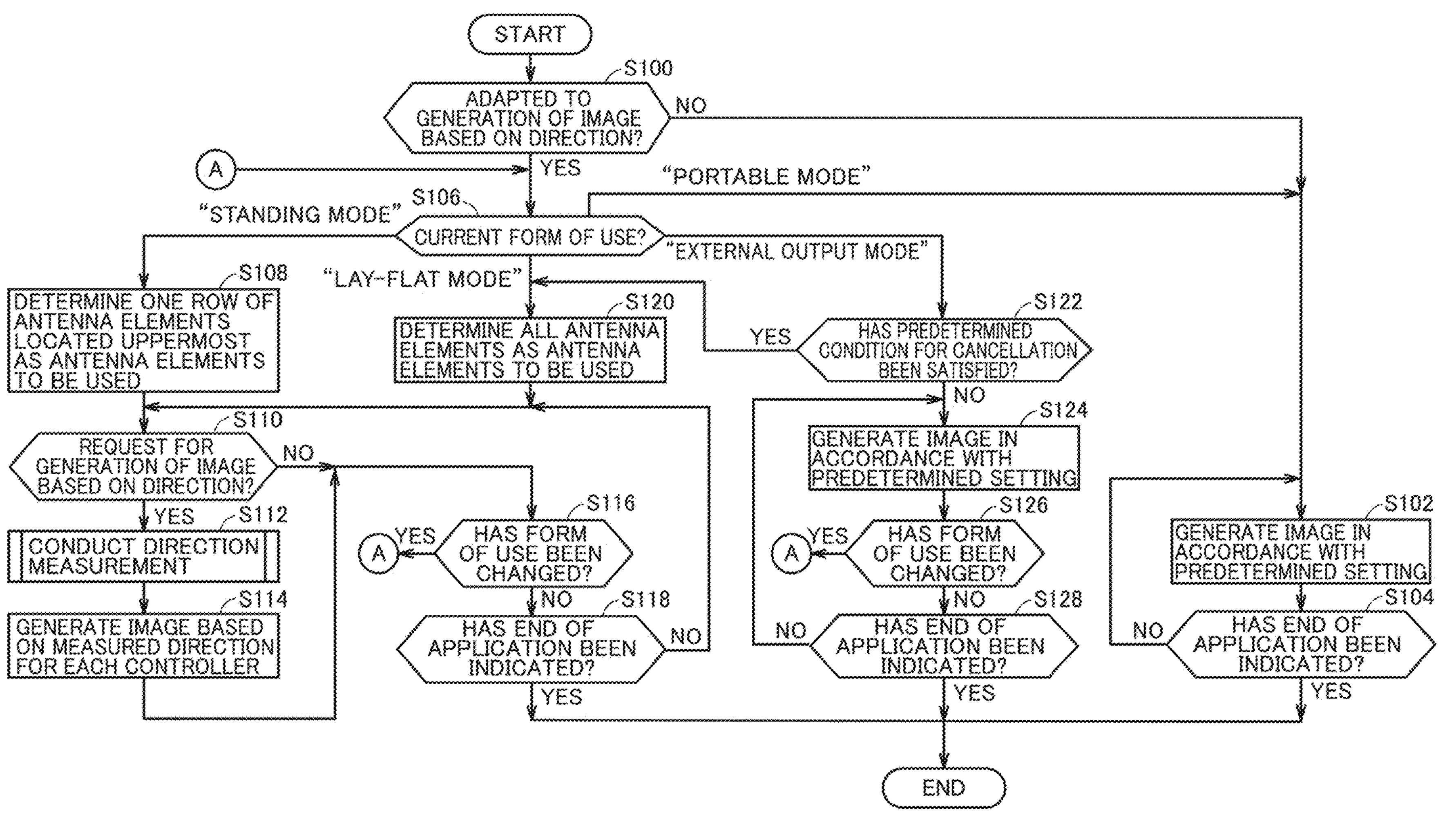
FIG.17
START
S100
ADAPTED TO GENERATION OF IMAGE BASED ON DIRECTION?
YES
NO
A
S106
CURRENT FORM OF USE?
"STANDING MODE"
"LAY-FLAT MODE"
"EXTERNAL OUTPUT MODE"
"PORTABLE MODE"
S108
DETERMINE ONE ROW OF ANTENNA ELEMENTS LOCATED UPPERMOST AS ANTENNA ELEMENTS TO BE USED
S120
DETERMINE ALL ANTENNA ELEMENTS AS ANTENNA ELEMENTS TO BE USED
S122
HAS PREDETERMINED CONDITION FOR CANCELLATION BEEN SATISFIED?
S110
REQUEST FOR GENERATION OF IMAGE BASED ON DIRECTION?
S112
CONDUCT DIRECTION MEASUREMENT
S114
GENERATE IMAGE BASED ON MEASURED DIRECTION FOR EACH CONTROLLER
S116
HAS FORM OF USE BEEN CHANGED?
S118
HAS END OF APPLICATION BEEN INDICATED?
S124
GENERATE IMAGE IN ACCORDANCE WITH PREDETERMINED SETTING
S126
HAS FORM OF USE BEEN CHANGED?
S128
HAS END OF APPLICATION BEEN INDICATED?
S102
GENERATE IMAGE IN ACCORDANCE WITH PREDETERMINED SETTING
S104
HAS END OF APPLICATION BEEN INDICATED?
END

SYSTEM, PORTABLE ELECTRONIC DEVICE, PROCESSING METHOD, AND NON-TRANSITORY COMPUTER-READABLE STORAGE MEDIUM

This non-provisional application claims priority on and is a continuation of International Patent Application PCT/JP2022/006690 filed with the Japan Patent Office on Feb. 18, 2022, the entire contents of which are hereby incorporated by reference.

FIELD

The present disclosure relates to a system, a portable electronic device, a processing method, and a non-transitory computer-readable storage medium having instructions stored thereon.

BACKGROUND AND SUMMARY

An apparatus including a display, the apparatus outputting an image also to an external display apparatus separate from the display, has conventionally been known.

It would be desirable to further improve operability as compared with the known apparatus described above.

An exemplary embodiment provides a system that includes a portable electronic device including a display and an interface for output of an image to an external display separate from the display, a controller to receive a user operation, one or more processors, and one or more memories to store instructions that, when executed by the one or more processors, cause the one or more processors to perform generating an image in accordance with the user operation onto the controller and obtaining a direction in which the controller is present with respect to the portable electronic device (or, in other words, obtaining a direction of the controller relative to the portable electronic device). The generating the image includes generating the image based on the obtained direction when the image is outputted to the display and restricting generation of the image based on the obtained direction when the image is outputted to the external display.

In this sense, an exemplary embodiment provides a system that includes a portable electronic device comprising a device display and an interface configured to connect the portable electronic device to an external display separate from the device display; a user-operable controller; and one or more memories storing instructions that, when executed, cause one or more processors of the system to perform operations comprising generating an image in accordance with a user operation provided via the controller. When the image is to be output to the device display, the image is generated based on a direction in which the controller is present with respect to the portable electronic device. When the image is to be output to the external display, the image is generated without regard to the direction in which the controller is present with respect to the portable electronic device.

According to this configuration, since the image based on the direction in which the controller (and the user who operates the controller) is present with respect to the portable electronic device is generated, an intuitive operation can be provided to the user.

In output of the image to the external display, even when the direction in which the controller is present with respect to the portable electronic device is measured, the positional relation between the external display and the portable electronic device is not fixed and hence the measured direction may not reflect the direction in which the real controller (and the user who operates the controller) is present. Therefore, by restricting generation of the image based on the measured direction when the image is outputted to the external display, the possibility of an uncomfortable or disorienting feeling that otherwise might be felt by the user can be lowered.

The controller may transmit a wireless signal. Calculation of the direction in which the controller is present may be based on a phase difference caused when a plurality of antenna elements arranged at distant positions receive the wireless signal. According to this configuration, since the direction in which the controller is present can be measured with the use of the wireless signal (for example, including information on the user operation) exchanged between the portable electronic device and the controller, the direction can be measured efficiently using existing hardware and while computational cost is suppressed.

The one or more processors, responsive to executing the instructions, may deactivate obtainment of the direction in which the controller is present when the image is outputted to the external display. Since generation of the image based on the measured direction is restricted when the image is outputted to the external display, measurement per se of the direction is not necessary. That is, in certain example embodiments, the direction in which the controller is present may not be obtained when the image is to be output to the external display. By deactivating measurement of the direction, an unnecessary increase in processing resources and communication band necessary for measurement of the direction can be suppressed.

The one or more processors, responsive to executing the instructions, may cancel restriction of generation of the image based on the obtained direction when a predetermined condition is satisfied even when the image is outputted to the external display. That is, the image may be generated based on a direction in which the controller is present with respect to the portable electronic device even when the image is to be output to the external display, provided that a condition is satisfied. For example, a condition for ensuring that the measured direction reflects the direction in which the real controller (and the user who operates the controller) is present can be adopted. An intuitive operation can thus be provided to the user even when the image is outputted to the external display.

The one or more processors, responsive to executing the instructions, may change an antenna element to be used for calculation of the direction in which the controller is present among the plurality of antenna elements, in accordance with at least one of an attitude of the portable electronic device and/or an application program executed by the one or more processors. According to this configuration, by appropriately selecting an antenna element to be used depending on a situation, an increase in processing load can be suppressed and measurement accuracy can be improved.

The one or more processors, responsive to executing the instructions, may cause use of at least one antenna element of the plurality of antenna elements in at least one of a case in which the display is in a first attitude in which the display is placed as being laterally oriented or orientated obliquely upward and/or a case in which the application program corresponding to the first attitude is running. That is, at least one antenna element of the plurality of antenna elements may be used in the calculation in a first case in which the device display is in a first attitude in which the device display is placed so as to be laterally oriented or orientated obliquely upward, and in a second case in which an application program executed by the one or more processors is programmed to operate according to the first attitude is running.

In the first attitude, the controller (and the user who operates the controller) is assumed as being present at a position where the controller faces the display. Therefore, at least one antenna element is used to measure the direction within an area where the controller is present. By thus using at least one antenna element, an increase in processing load can be suppressed.

The one or more processors, responsive to executing the instructions, may cause use of all of the plurality of antenna elements in at least one of a case in which the display is in a second attitude in which the display is placed as facing up and/or a case in which the application program corresponding to the second attitude is running. That is, all of the plurality of antenna elements may be used in the calculation in a first case in which the device display is in a second attitude in which the display is placed so as to be facing up, and in a second case in which an application program executed by the one or more processors is programmed to operate according to the second attitude is running.

In the second attitude, the controller (and the user who operates the controller) may be present around the display. Therefore, all antenna elements are used to measure the direction of the controller wherever the controller may be present. The direction of the controller can thus more reliably be measured.

The plurality of antenna elements may include at least two antenna elements for each direction, the at least two antenna elements being arranged along each of two directions defining a display surface of the display, and the at least one antenna element to be used may be a row of antenna elements among the plurality of antenna elements. According to this configuration, the direction (that is, an angle) of the controller with a direction of alignment of antenna elements (corresponding to any side of the display) being defined as a reference can be calculated. Therefore, for example, as compared with an example in which a plurality of antenna elements along a direction different from the two directions defining the display surface of the display are used, measurement accuracy can be improved.

The row of antenna elements may be an uppermost row of antenna elements among the plurality of antenna elements. According to this configuration, noise such as a reflection component from a table or the like on which the portable electronic device is placed can be reduced.

The one or more processors, responsive to executing the instructions, may change an antenna element to be used for calculation of the direction in which the controller is present among the plurality of antenna elements, in accordance with the previously obtained direction in which the controller is present. According to this configuration, by selecting an antenna element capable of measuring a direction in which the controller is actually present, measurement in an area where the controller is not present does not have to be conducted. An increase in processing load can thus be suppressed and measurement accuracy can be improved.

The one or more processors, responsive to executing the instructions, may change a frequency of calculation of the direction in which the controller is present, in accordance with the previously obtained direction in which the controller was present. According to this configuration, by changing a frequency of calculation of the direction in accordance with the direction in which the controller is actually present, an increase in processing load can be suppressed and power consumption can be reduced.

The one or more processors, responsive to executing the instructions, may generate the image in accordance with a predetermined setting independently of the obtained direction when switching from a state in which the image is outputted to the display to a state in which the image is outputted to the external display is made. When switching from the state in which the image is outputted to the display to the state in which the image is outputted to the external display is made, it is highly likely that the positional relation between the portable electronic device and the controller has been changed. Therefore, output of the image in the state in which the image is outputted to the display as it is may give an uncomfortable or disorienting feeling to the user. According to this configuration, the possibility of such uncomfortable or disorienting feeling felt by the user can be lowered.

The one or more processors, responsive to executing the instructions, may start generation of the image based on the obtained direction after lapse of a predetermined time period since switching from a state in which the image is outputted to the external display to a state in which the image is outputted to the display is made.

The one or more processors, responsive to executing the instructions, may start generation of the image based on the measured direction when a motion of the portable electronic device is within a predetermined range after switching from a state in which the image is outputted to the external display to a state in which the image is outputted to the display is made.

The one or more processors, responsive to executing the instructions, may start generation of the image based on the measured direction when temporal change in relative positional relation between the portable electronic device and the controller is within a predetermined range after switching from a state in which the image is outputted to the external display to a state in which the image is outputted to the display is made.

When switching from the state in which the image is outputted to the external display to the state in which the image is outputted to the display is made, it is highly likely that the positional relation between the portable electronic device and the controller has been changed. Therefore, output of the image in the state in which the image is outputted to the external display as it is may give uncomfortable or disorienting feeling to the user. According to each configuration described above, the possibility of such uncomfortable or disorienting feeling felt by the user can be lowered.

Another exemplary embodiment provides a portable electronic device that communicates with a controller to receive a user operation. The portable electronic device includes a display, an interface for output of an image to an external display separate from the display, one or more processors, and one or more memories to store instructions that, when executed by the one or more processors, cause the one or more processors to perform generating an image in accordance with the user operation onto the controller and obtaining a direction in which the controller is present with respect to the portable electronic device (or, in other words, obtaining a direction of the controller relative to the portable electronic device). The generating the image includes generating the image based on the obtained direction when the image is outputted to the display and restricting generation of the image based on the obtained direction when the image is outputted to the external display.

In this sense, an exemplary embodiment provides a portable electronic device configured to communicate with a user-operable controller. The portable electronic device comprises: a device display; an interface configured to connect the portable electric device an external display separate from the device display; and one or more memories configured to store instructions that, when executed, cause one or more processors of the portable electronic device to perform operations comprising: generating an image in accordance with a user operation provided via the controller. When the image is to be output to the device display, the image is generated based on a direction in which the controller is present with respect to the portable electronic device. When the image is to be output to the external display, the image is generated without regard to the direction in which the controller is present with respect to the portable electronic device.

Another exemplary embodiment provides a processing method performed by a portable electronic device including a display and an interface for output of an image to an external display separate from the display. The processing method includes communicating with a controller that receives a user operation, measuring a direction in which the controller is present with respect to a computer, and generating an image in accordance with the user operation onto the controller. The generating the image includes generating the image based on the measured direction when the image is outputted to the display and restricting generation of the image based on the measured direction when the image is outputted to the external display.

In this sense, an exemplary embodiment provides a processing method performed by a portable electronic device comprising a device display and an interface configured to connect the portable electronic device to an external display separate from the device display. The processing method comprises communicating with a user-operable controller; and generating an image in accordance with a user operation provided via the controller. When the image is to be output to the device display, the image is generated based on a direction in which the controller is present with respect to the portable electronic device. When the image is to be output to the external display, the image is generated without regard to the direction in which the controller is present with respect to the portable electronic device.

Another exemplary embodiment provides a non-transitory computer-readable storage medium having instructions stored thereon which, when executed by one or more processors electrically connected to a display and an interface for output of an image to an external display separate from the display, cause the one or more processors to perform communicating with a controller that receives a user operation, measuring a direction in which the controller is present with respect to a portable electronic device, and generating an image in accordance with the user operation onto the controller. The generating the image includes generating the image based on the measured direction when the image is outputted to the display and restricting generation of the image based on the measured direction when the image is outputted to the external display.

In this sense, an exemplary embodiment provides a non-transitory computer-readable storage medium having instructions stored thereon which, when executed, cause one or more processors of a portable electronic device to perform operations comprising: communicating with a user-operable controller; and generating an image in accordance with a user operation provided via the controller. When the image is to be output to a device display of the portable electronic device, the image is generated based on a direction in which the controller is present with respect to the portable electronic device. When the image is to be output to an external display separate from the device display, the image is generated without regard to the direction in which the controller is present with respect to the portable electronic device.

The foregoing and other features, aspects, and advantages of the present disclosure will become more apparent from the following detailed description when taken in conjunction with the accompanying drawings.

BRIEF DESCRIPTION OF THE DRAWINGS

FIG. 1 shows an exemplary illustrative non-limiting drawing illustrating an exemplary configuration of a system according to the present embodiment.

FIG. 3 shows an exemplary illustrative non-limiting drawing illustrating an exemplary hardware configuration of a controller in the system according to the present embodiment.

FIG. 4 shows an exemplary illustrative non-limiting drawing illustrating an exemplary form of use of the system according to the present embodiment.

FIGS. 14 and 15 show exemplary illustrative non-limiting drawings illustrating an exemplary screen in switching to the external output mode, of the game device in the system according to the present embodiment.

FIG. 17 shows an exemplary illustrative non-limiting drawing illustrating a flowchart showing a procedure of processing performed by the game device in the system according to the present embodiment.

DETAILED DESCRIPTION OF NON-LIMITING EXAMPLE EMBODIMENTS

Figure 2:
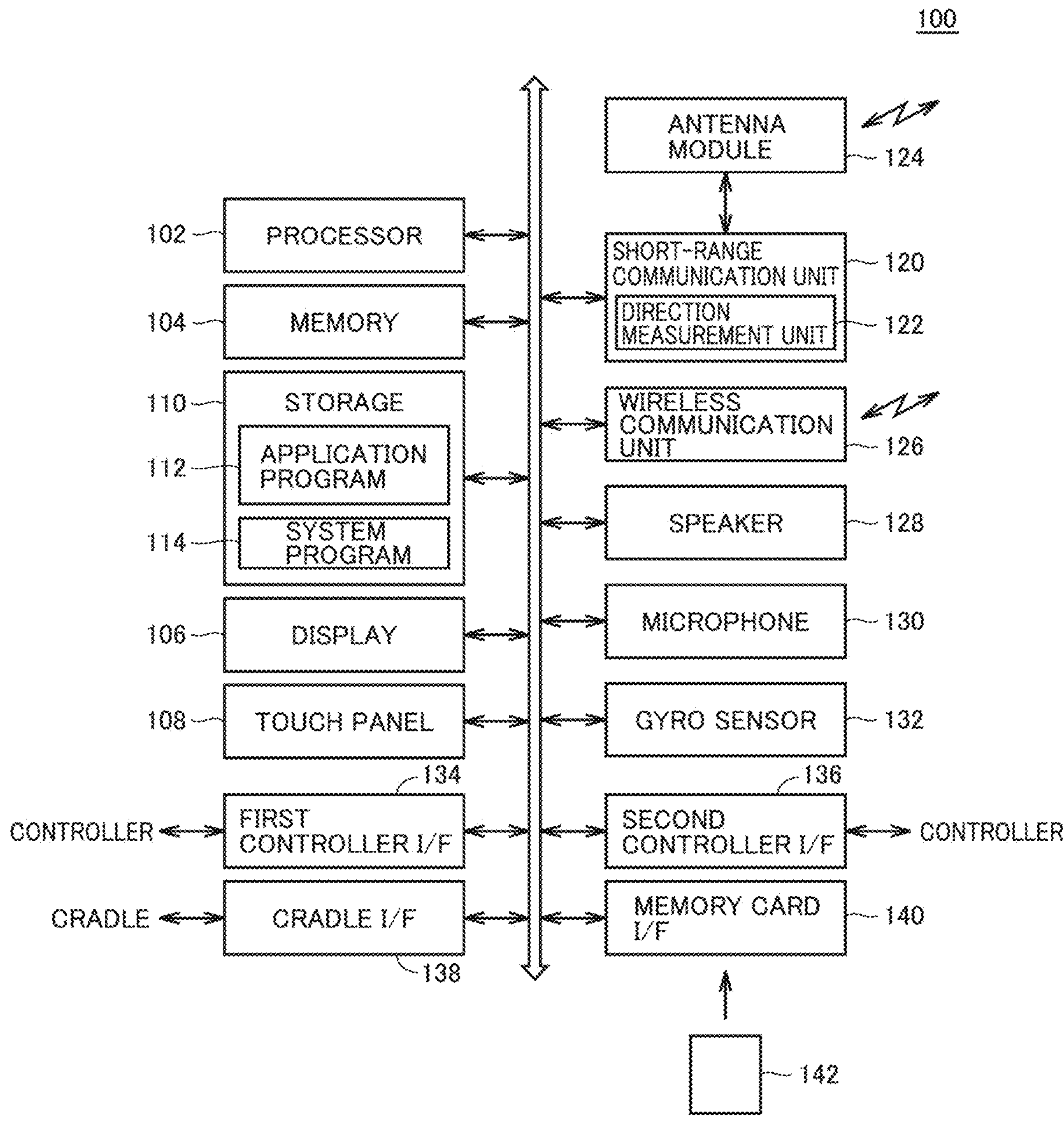
FIG. 2 shows an exemplary illustrative non-limiting drawing illustrating an exemplary hardware configuration of a game device in the system according to the present embodiment.

The present embodiment will be described in detail with reference to the drawings. The same or corresponding elements in the drawings have the same reference characters allotted and description thereof will not be repeated.

[A. Exemplary Configuration]

An exemplary configuration of a system 1 according to the present embodiment will initially be described.

Though a game device will be described by way of example of a portable electronic device in the description below, the portable electronic device is not limited to the game device, and any computer such as a smartphone, a tablet, and a personal computer can be adopted. The portable electronic device can also be referred to as a portable information processing apparatus.

An exemplary configuration of system 1 according to the present embodiment will be described with reference to FIG. 1. System 1 includes a game device 100 and one or more controllers 200.

The "controller" herein is a term encompassing a device that receives a user operation, and encompasses, for example, a general-purpose input device such as a keyboard, a mouse, and a pen tablet and an operation apparatus used for a specific application, without being limited to a game controller.

Game device 100 exchanges data with each of controllers 200 over a wireless signal. In other words, controller 200 transmits the wireless signal. The wireless signal may be transmitted in accordance with a user operation.

Controller 200 may be attachable to game device 100. In the present embodiment, controller 200 is attached to each of opposing sides of game device 100. While controller 200 is attached to game device 100, game device 100 may electrically be connected to controller 200. At this time, data may be exchanged through wired communication. Even while controller 200 is attached to game device 100, data may be exchanged through wireless communication.

Though a difference in structure and function between controllers 200 is not mentioned for the sake of convenience of description, the structure and the function of controller 200 may be different depending on a side (left side/right side) of attachment to game device 100.

Game device 100 includes a display 106 on which any image is shown and a touch panel 108 that receives a user operation. The display 106 is also sometimes referred to herein as a "device display" because it may be a part of (e.g., integral with) the game device 100 in certain example embodiments.

Game device 100 includes an antenna module 124 that receives a wireless signal from controller 200. Though antenna module 124 may be arranged at any position in game device 100, it is arranged, for example, in parallel to a display surface of display 106.

Each controller 200 includes an operation portion 210 that receives a user operation. Operation portion 210 is composed, for example, of a push button, a cross-shaped key, and a control lever.

An exemplary hardware configuration of game device 100 in system 1 according to the present embodiment will be described with reference to FIG. 2. Game device 100 includes one or more processors 102, one or more memories 104, display 106, touch panel 108, a storage 110, a short-range communication unit 120, antenna module 124, a wireless communication unit 126, a speaker 128, a microphone 130, a gyro sensor 132, a first controller interface 134, a second controller interface 136, a cradle interface 138, and a memory card interface 140.

Processor 102 is a processing entity for performing processing provided by game device 100. Memory 104 is a storage device that can be accessed by processor 102, and it is implemented, for example, by a volatile storage device such as a dynamic random access memory (DRAM) or a static random access memory (SRAM). Storage 110 is implemented, for example, by a non-volatile storage device such as a flash memory.

Processor 102 performs processing as will be described later by reading a program stored in storage 110, developing the program on memory 104, and executing the program. For example, an application program 112 composed of instruction codes for implementing any information processing and a system program 114 that provides a library necessary for execution of a program are stored in storage 110.

Processor 102 performs processing necessary in game device 100. Attention is paid in particular to processing for generating an image to be shown on the display or to be outputted to the display among such processing. In other words, processor 102 corresponds to a processing unit that generates an image in accordance with a user operation onto controller 200.

Short-range communication unit 120 transmits and receives a wireless signal to and from one or more controllers 200. Any wireless scheme such as Bluetooth®, ZigBee®, wireless LAN (IEEE 802.11), or infrared communication can be adopted for short-range communication unit 120. An example in which Bluetooth® is adopted as the wireless scheme for short-range communication unit 120 is shown in the description below.

Antenna module 124 receives a wireless signal transmitted from one or more controllers 200. Antenna module 124 may be arranged as an antenna for transmission and reception of a wireless signal by short-range communication unit 120, or antenna module 124 may be arranged in addition to a normal antenna for transmission and reception of a wireless signal by short-range communication unit 120.

Short-range communication unit 120 includes a direction measurement unit 122 that measures a direction in which controller 200 is present with respect to game device 100 (that is, a direction in which controller 200 is present when viewed from game device 100). More specifically, direction measurement unit 122 measures based on a wireless signal from controller 200 received by antenna module 124, the direction in which controller 200 that has transmitted the wireless signal is present. A function provided by direction measurement unit 122 may be provided by short-range communication unit 120 or by coordination between short-range communication unit 120 and processor 102. Details of measurement processing by direction measurement unit 122 will be described later.

Wireless communication unit 126 exchanges over a wireless signal, data with a wireless relay connected to the Internet or the like. Any wireless scheme such as wireless LAN (IEEE802.11) and a public wireless channel (4G, 5G, or the like) can be adopted for wireless communication unit 126.

Speaker 128 generates sound around game device 100. Microphone 130 collects sound generated around game device 100.

Gyro sensor 132 detects an attitude of game device 100.

While controller 200 is attached to game device 100, first controller interface 134 and second controller interface 136 exchange data with attached controller 200.

While game device 100 is placed on a cradle which will be described later, cradle interface 138 exchanges data with the cradle.

Memory card interface 140 reads from a removable memory card 142, data stored in memory card 142 and writes data into memory card 142. An application program or the like may be stored in memory card 142.

An exemplary hardware configuration of controller 200 in system 1 according to the present embodiment will be described with reference to FIG. 3. Controller 200 includes one or more processors 202, one or more memories 204, an operation portion 210, an acceleration sensor 212, a short-range communication unit 220, and a main body communication unit 230.

Processor 202 performs processing necessary for controller 200 by developing a program on memory 204 and executing the program.

Operation portion 210 generates a signal in accordance with a user operation. Acceleration sensor 212 generates a signal in accordance with an acceleration caused in controller 200.

Short-range communication unit 220 transmits and receives a wireless signal to and from game device 100.

While controller 200 is attached to game device 100, main body communication unit 230 exchanges data with game device 100.

The term "processor" herein encompasses processing circuitry that performs processing in accordance with an instruction code described in a program, such as a central processing unit (CPU), a micro processing unit (MPU), or a graphics processing unit (GPU) and hard-wired circuitry such as an application specific integrated circuit (ASIC) or a field programmable gate array (FPGA). In the hard-wired circuitry such as an ASIC or an FPGA, a circuit corresponding to processing to be executed is formed in advance. Furthermore, the "processor" herein also encompasses circuitry in which a plurality of functions are integrated, such as a system on chip (SoC) and combination of the processing circuitry and the hard-wired circuitry.

The term "memory" herein encompasses a memory and a storage.

[B. Form of Use]

Some exemplary forms of use of system 1 according to the present embodiment will now be described. As described above, a pair of controllers 200 is attachable to game device 100. A user can use game device 100 by holding game device 100 while the pair of controllers 200 is attached thereto. Such a form of use of game device 100 as being held by the user is referred to as a "portable mode." In addition to the portable mode, a form of use as below is also applicable.

An exemplary form of use of system 1 according to the present embodiment will be described with reference to FIG. 4. FIG. 4 shows a form of use while an image is shown on device display 106 of game device 100. Referring to FIG. 4, while game device 100 is supported and placed on a stand 144 such that device display 106 is laterally oriented or oriented obliquely upward, one or more users operate controller(s) 200 while viewing the image shown on device display 106. The form of use of game device 100 with the use of stand 144 as shown in FIG. 4 is referred to as a "standing mode" in the description below for the sake of convenience.

Alternatively, game device 100 can also be used as being placed on a flat surface such as a table with device display 106 facing up. The form of use of game device 100 with device display 106 being placed as facing up is also referred to as a "lay-flat mode" in the description below for the sake of convenience. When application program 112 to be executed in game device 100 is provided in the lay-flat mode, processing may be performed in the lay-flat mode regardless of the attitude of game device 100.

Figure 5:
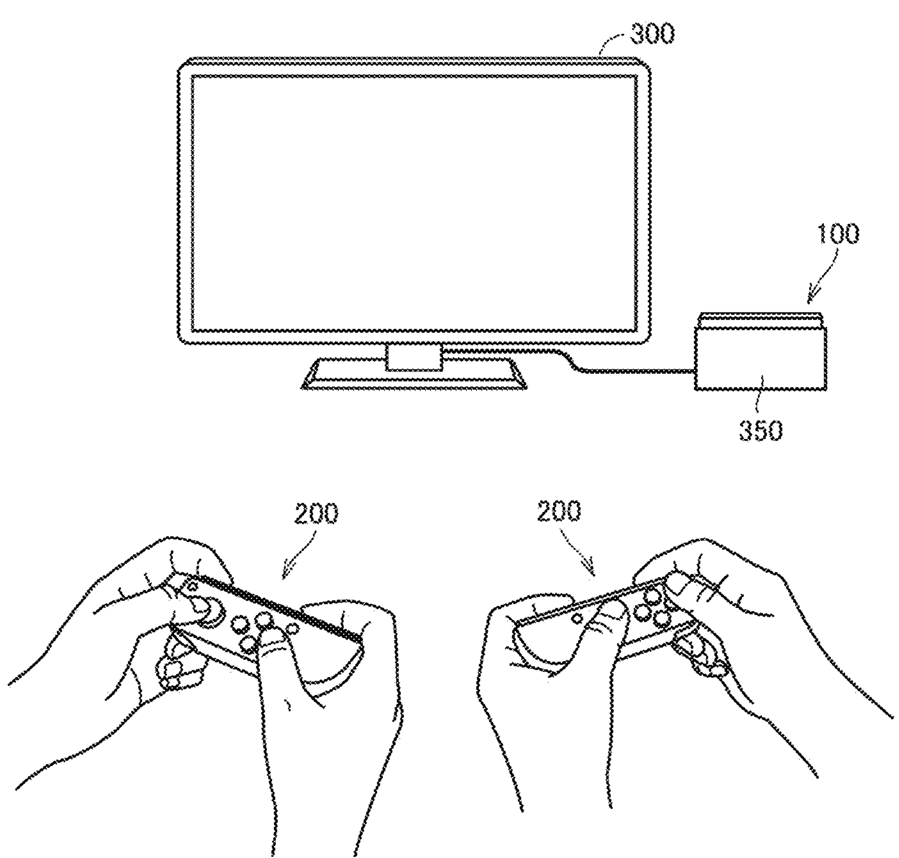
FIG. 5 shows an exemplary illustrative non-limiting drawing illustrating another exemplary form of use of the system according to the present embodiment.

Another exemplary form of use of system 1 according to the present embodiment will be described with reference to FIG. 5. FIG. 5 shows a form of use of game device 100 while an image is shown on an external display 300 separate from device display 106 of game device 100. Referring to FIG. 5, while game device 100 is placed on a cradle 350, one or more users operate controller(s) 200 while viewing the image shown on external display 300. Game device 100 thus includes device display 106 and cradle interface 138 (see FIG. 2) for output of an image to external display 300 separate from device display 106. The form of use of game device 100 with game device 100 being placed on cradle 350 is referred to as an "external output mode" in the description below for the sake of convenience.

In the external output mode, communication between game device 100 and cradle 350 and/or between cradle 350 and external display 300 may be wired communication or wireless communication.

As described above, system 1 according to the present embodiment can be different in form of use.

[C. Direction Measurement]

Direction measurement that can be conducted by system 1 according to the present embodiment will now be described.

In system 1 according to the present embodiment, game device 100 performs a function to measure a direction in which controller 200 is present based on a wireless signal received from controller 200. More specifically, game device 100 calculates the direction in which controller 200 is present based on a phase difference caused at the time of reception of the wireless signal by a plurality of antenna elements arranged at distant positions.

Principles of direction measurement by system 1 according to the present embodiment will be described with reference to FIG. 6. Antenna module 124 includes a plurality of antenna elements 125-1 and 125-2 (which may also collectively be referred to as an "antenna element 125" below).

Since a distance between game device 100 and controller 200 is sufficiently longer than a wavelength of the wireless signal, the wireless signal transmitted from controller 200 can be regarded as a plane wave. Therefore, an equiphase plane 240 of the wireless signal transmitted from controller 200 is orthogonal to a straight line that connects controller 200 and a center O between antenna element 125-1 and antenna element 125-2 to each other (a straight line at an angle $\theta$ with respect to the straight line that connects antenna element 125-1 and antenna element 125-2 to each other.). Angle $\theta$ represents an angle of incidence of the wireless signal on antenna module 124 and is also referred to as an angle of arrival.

Figure 6:
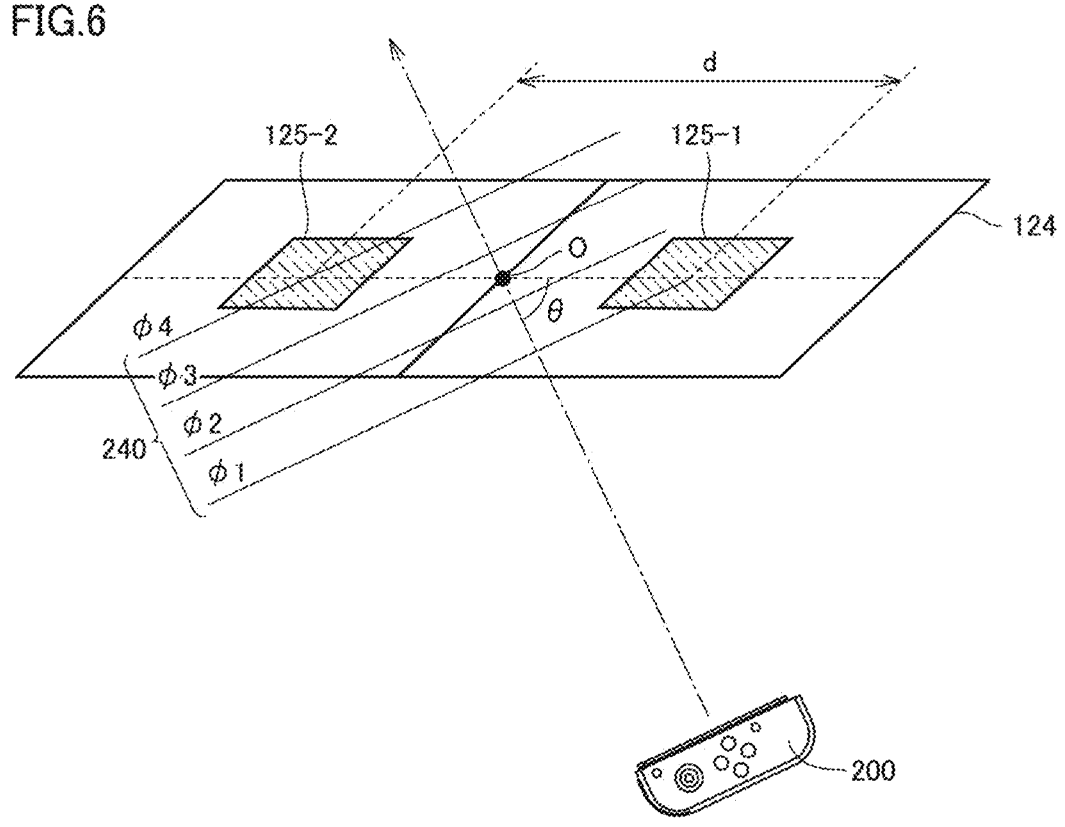
FIG. 6 shows an exemplary illustrative non-limiting drawing illustrating principles of direction measurement in the system according to the present embodiment.

In the example shown in FIG. 6, antenna element 125-1 intersects with equiphase plane 240 at a phase $\phi 1$ and antenna element 125-2 intersects with equiphase plane 240 at a phase $\phi 4$. In other words, a phase difference $\Delta\phi$ by $|$phase $\phi 1$-phase $\phi 4|$ is caused between the wireless signal received by antenna element 125-1 and the wireless signal received by antenna element 125-2. This phase difference $\Delta\phi$ is dependent on angle $\theta$ and a distance d between elements.

More specifically, a relational expression as below is satisfied where $\lambda$ represents a wavelength of the wireless signal.

$$\Delta\phi=2\pi\times(d\times\cos(\theta)/\lambda)$$

This relational expression can be summarized with respect to angle $\theta$ (angle of arrival) to an expression as below.

$$\theta=\cos-1((\Delta\phi\times\lambda)/(2\pi\times d))$$

Since wavelength $\lambda$ of the wireless signal and distance d between the elements have already been known, the direction (angle $\theta$) in which controller 200 is present can be calculated based on phase difference $\Delta\phi$ caused in the wireless signal received by two antenna elements 125.

Though antenna module 124 should only include at least two antenna elements 125, measurement accuracy can be enhanced by including more antenna elements 125.

Exemplary antenna module 124 in which a plurality of antenna elements 125 are arranged in one direction will be described with reference to FIG. 7. Antenna module 124 shown in FIG. 7 includes four antenna elements 125-1 to 125-4 arranged in one row along an X axis. In such arrangement of antenna elements 125, an (a one-dimensional) angle of arrival with respect to the X axis can be measured. More specifically, two antenna modules 124 can be used to measure the angle of arrival of the wireless signal transmitted from controller 200 when viewed from the center between two antenna modules 124. Any two adjacent antenna elements 125 may be selected, or two adjacent antenna elements 125 may successively be selected. Alternatively, in another embodiment, any two antenna elements which are not adjacent to each other may be selected.

Figure 7:
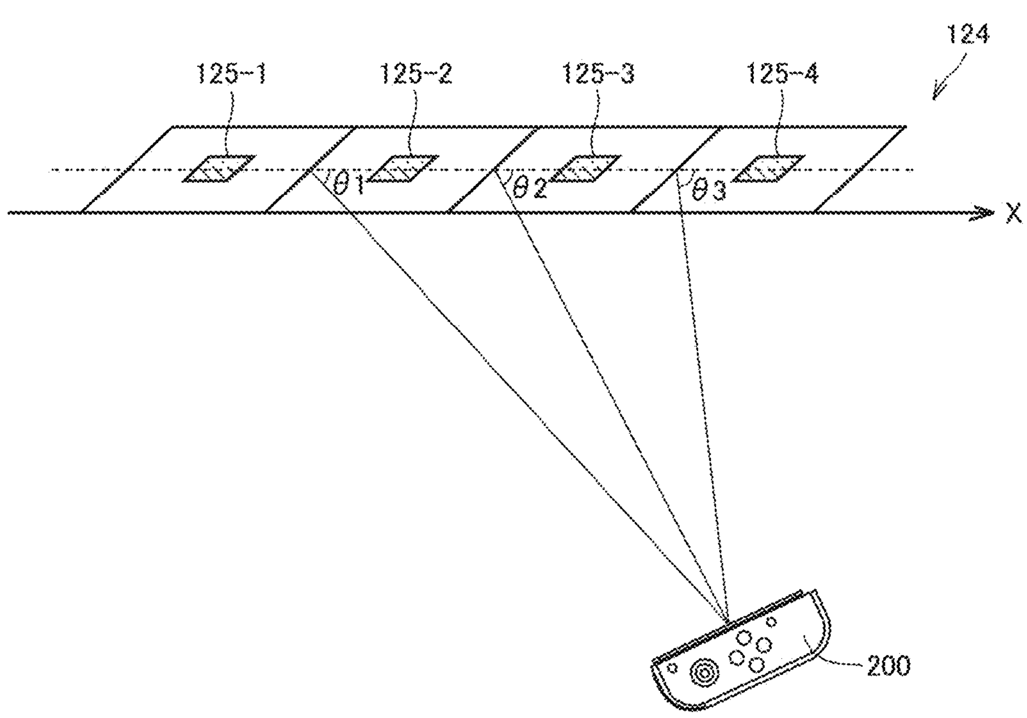
FIG. 7 shows an exemplary illustrative non-limiting drawing illustrating an exemplary antenna module in which a plurality of antenna elements are arranged in one direction.

In the example shown in FIG. 7, an angle $\theta$1 can be measured by selection of antenna element 125-1 and antenna element 125-2, an angle $\theta$2 can be measured by selection of antenna element 125-2 and antenna element 125-3, and an angle $\theta$3 can be measured by selection of antenna element 125-3 and antenna element 125-4.

In addition to the direction of controller 200 that has transmitted the wireless signal at the measured angle, a position (or a distance) of controller 200 can be measured. The direction and the position to be measured are each expressed as a value relative to game device 100. Therefore, processing for measuring the "direction" herein may encompass processing for measuring the "position".

Exemplary antenna module 124 in which a plurality of antenna elements 125 are arranged in two directions will be described with reference to FIG. 8. Antenna module 124 shown in FIG. 8 includes 4×4 antenna elements 125-11 to 125-44 arranged along the X axis and a Y axis. In such arrangement of antenna elements 125, an (a two-dimensional) angle of arrival with respect to each of the X axis and the Y axis can be measured.

More specifically, two antenna modules 124 arranged in the same row along the X axis can be used to measure a component with respect to the X axis, of the angle of arrival of the wireless signal transmitted from controller 200. Similarly, two antenna modules 124 arranged in the same row along the Y axis can be used to measure a component with respect to the Y axis, of the angle of arrival of the wireless signal transmitted from controller 200.

Figure 8:
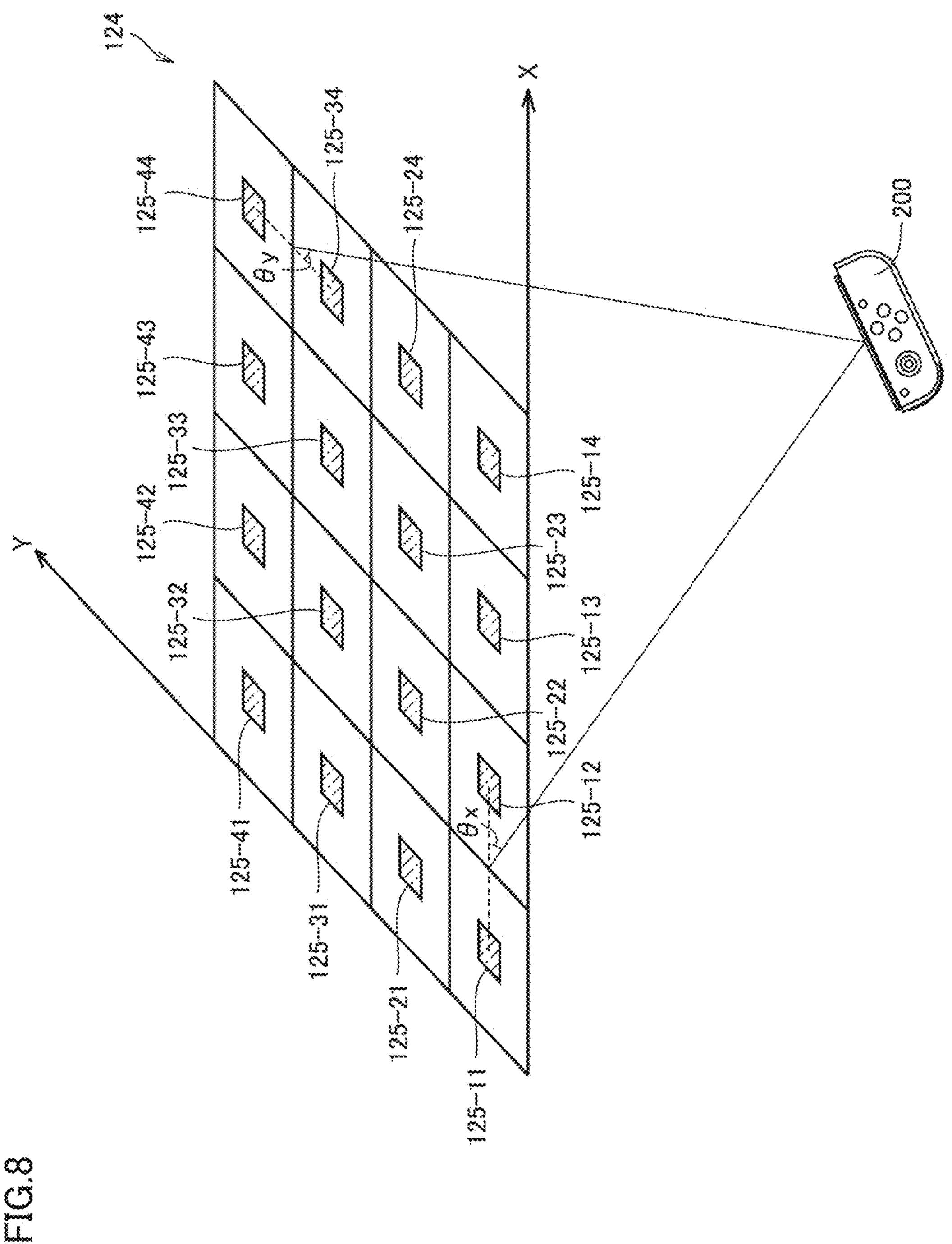
FIG. 8 shows an exemplary illustrative non-limiting drawing illustrating an exemplary antenna module in which a plurality of antenna elements are arranged in two directions.

In the example shown in FIG. 8, an angle $\theta x$ which is a component of the angle of arrival with respect to the X axis can be measured by selecting antenna element 125-11 and antenna element 125-12, and an angle $\theta y$ which is a component of the angle of arrival with respect to the Y axis can be measured by selecting antenna element 125-34 and antenna element 125-44.

In addition to the direction of controller 200, a position (or a distance) of controller 200 can be measured by conducting measurement a plurality of times with combination of antenna elements 125 being varied as in FIG. 7.

In direction measurement as described above, a plurality of antenna elements 125 should receive the same wireless signal. Though a plurality of reception circuits may be prepared, antenna element 125 to be used for reception among the plurality of antenna elements 125 may successively be switched for a common reception circuit.

Figure 9:
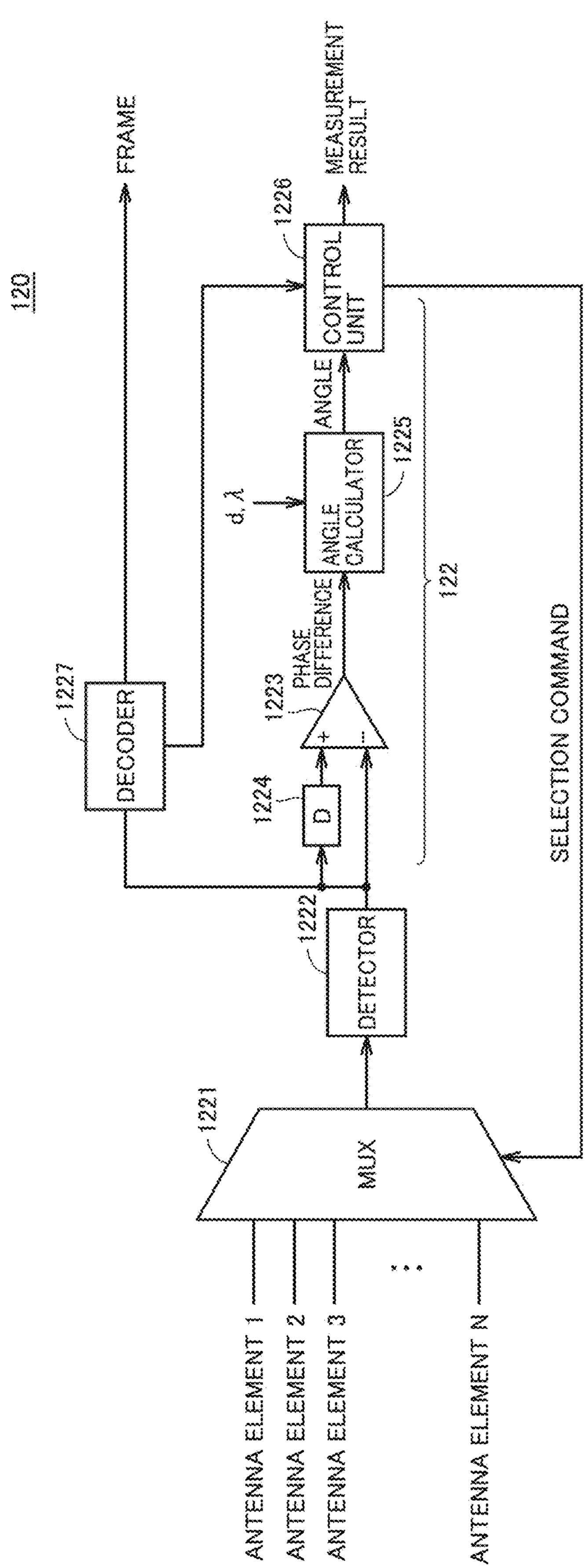
FIG. 9 shows an exemplary illustrative non-limiting drawing illustrating an exemplary configuration of a short-range communication unit in the system according to the present embodiment.

An exemplary configuration of short-range communication unit 120 in system 1 according to the present embodiment will be described with reference to FIG. 9. FIG. 9 shows an example in which direction measurement unit 122 is mounted as a part of the configuration of short-range communication unit 120.

Short-range communication unit 120 includes a multiplexer 1221, a detector 1222, a subtractor 1223, a delay element 1224, an angle calculator 1225, a control unit 1226, and a decoder 1227. Direction measurement unit 122 is mainly composed of subtractor 1223, delay element 1224, angle calculator 1225, and control unit 1226.

Multiplexer 1221 selects one antenna element 125 from among the plurality of antenna elements 125 in accordance with a selection command from control unit 1226.

Detector 1222 decodes a wireless signal received by antenna element 125 connected with multiplexer 1221 being interposed and outputs the decoded signal.

Subtractor 1223 calculates a phase difference between signals outputted from detector 1222. A signal outputted from detector 1222 is directly inputted to one terminal of subtractor 1223 and a signal outputted from detector 1222 is inputted to the other terminal of subtractor 1223 via delay element 1224. Time of delay by delay element 1224 is set in accordance with time of selection by multiplexer 1221. In other words, subtractor 1223 receives input of the signal obtained by decoding of the wireless signal received by currently selected antenna element 125 and the signal obtained by decoding of the wireless signal received by immediately precedently selected antenna element 125.

Angle calculator 1225 calculates an angle (angle of arrival) from the phase difference calculated by subtractor 1223. Distance d between the elements and wavelength $\lambda$ are set in advance in angle calculator 1225.

Control unit 1226 outputs a selection command to multiplexer 1221 and outputs a measurement result indicating a direction in which controller 200 is present by performing statistic processing (for example, averaging processing or outlier exclusion processing) on angles calculated successively by angle calculator 1225 in accordance with the selection command. The measurement result may include a distance to controller 200 in addition to a one-dimensional angle or a two-dimensional angle indicating the direction in which controller 200 is present.

Decoder 1227 reconstructs a frame from the signal outputted from detector 1222. Decoder 1227 outputs identification information for identifying a sender of the wireless signal to control unit 1226 based on information included in the frame.

Figure 10:
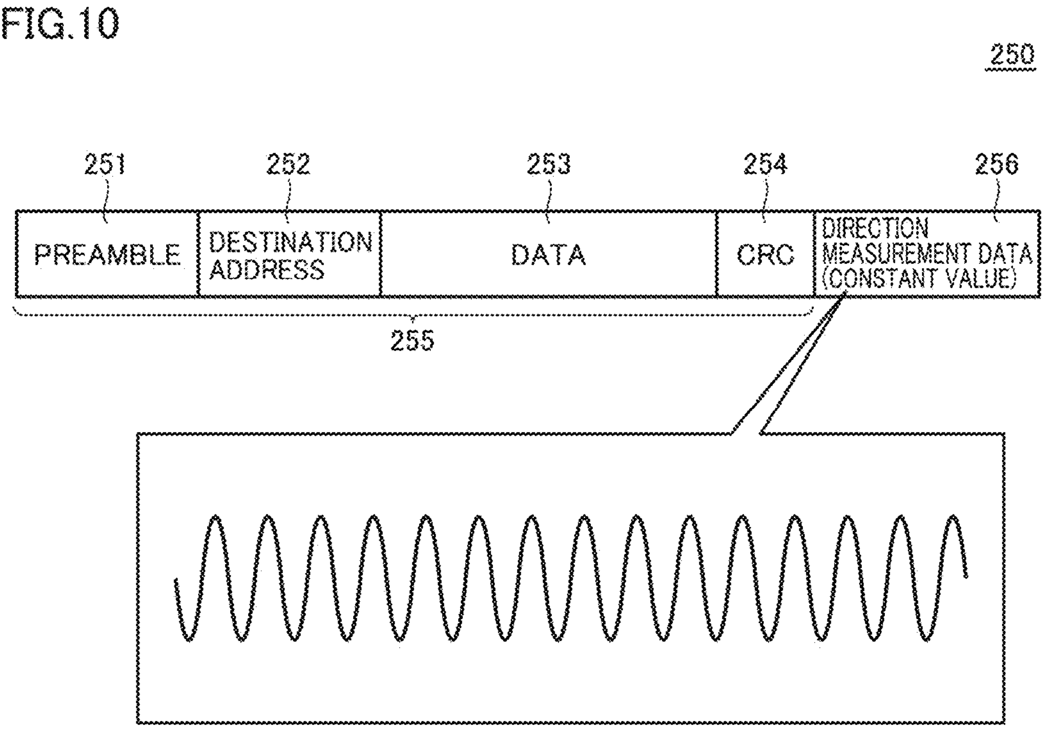
FIG. 10 shows an exemplary illustrative non-limiting drawing illustrating an exemplary configuration of a frame transmitted by the controller in the system according to the present embodiment.

An exemplary configuration of a frame transmitted by controller 200 in system 1 according to the present embodiment will be described with reference to FIG. 10.

A frame 250 includes a header 251, a destination address 252, data 253, a CRC 254, and direction measurement data 256. Header 251, destination address 252, data 253, and CRC 254 correspond to a substantial frame 255.

Direction measurement data 256 includes a plurality of constant values (normally "1"). Since the value included in direction measurement data 256 does not vary over time, the wireless signal is a sinusoidal wave, a phase and an amplitude of which do not vary over time. Direction measurement as described above is conducted with the use of this sinusoidal wave.

Destination address 252 includes identification information for identifying controller 200 that has transmitted the wireless signal. Therefore, in an example where a plurality of controllers 200 are connected to game device 100, the direction can be measured for each controller 200. Specifically, from which controller 200 the wireless signal comes is identified based on information included in destination address 252, and then the direction in which identified controller 200 is present is measured.

[D. Exemplary Processing Using Measurement Result in Direction Measurement]

Some processing examples using measurement results in direction measurement described above will now be described.

In system 1 according to the present embodiment, game device 100 can generate an image based on the direction in which controller 200 is present. The image based on the measured direction, however, may be generated only when the direction in which controller 200 is present can appropriately be measured. More specifically, game device 100 generates an image based on the measured direction when the image is outputted to device display 106 (specifically, in the standing mode or the lay-flat mode). In contrast, when the image is outputted to external display 300 (specifically, the external output mode), generation of the image based on the measured direction is restricted. Details of each mode will be described below.

(d1: Standing Mode)

Figure 11A:
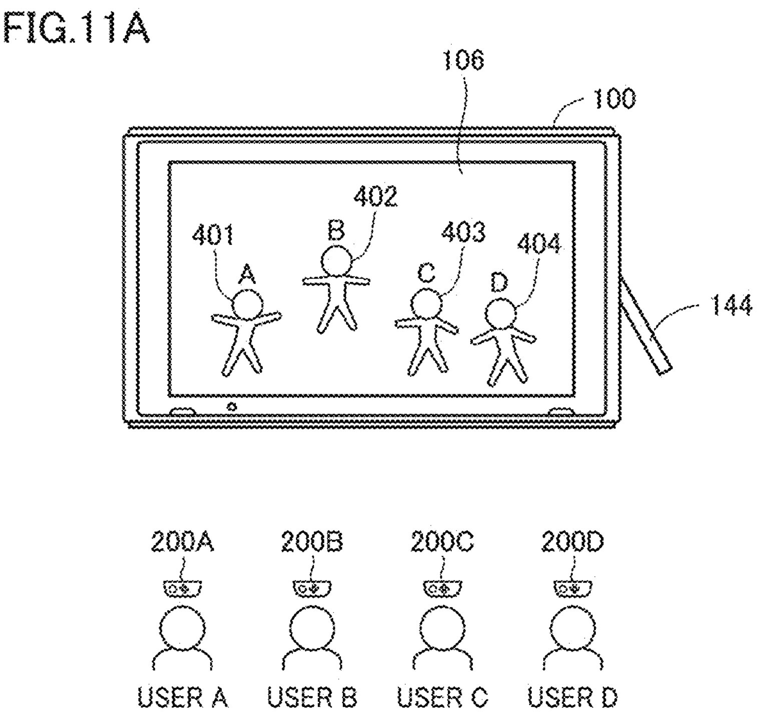
FIGS. 11A and 11B show exemplary illustrative non-limiting drawings illustrating an exemplary screen outputted in a standing mode by the game device in the system according to the present embodiment.

An exemplary screen outputted in the standing mode by game device 100 in system 1 according to the present embodiment will be described with reference to FIGS. 11A and 11B. Referring to FIG. 11A, a user A uses a controller 200A to operate an object 401, a user B uses a controller 200B to operate an object 402, a user C uses controller 200C to operate an object 403, and a user D uses a controller 200D to operate an object 404.

At this time, positions where objects 401 to 404 are shown reflect positions where the users A to D (controllers 200A to 200D) are present with respect to game device 100. Specifically, from the left as facing game device 100, controller 200A, controller 200B, controller 200C, and controller 200D are present in this order, and in correspondence with this positional relation, object 401, object 402, object 403, and object 404 are shown on device display 106 sequentially from the left.

As the positional relation among controllers 200 changes, an image shown on device display 106 also changes.

Figure 11B:
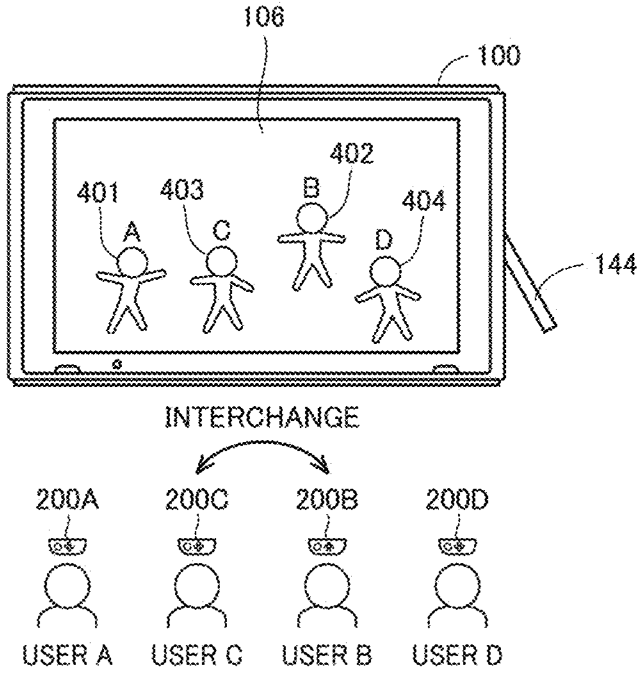

FIG. 11B shows a state in which the user B and the user C have interchanged in their positions by way of example. Since positions where controller 200B and controller 200C are present consequently change, positions where object 402 and object 403 are shown on device display 106 also change.

Whether or not the standing mode has been set may be determined based on a result of detection by gyro sensor 132 of game device 100, or when application program 112 to be executed is premised on execution in the standing mode, processing in the standing mode may be performed regardless of the result of detection by gyro sensor 132.

When the image is outputted to device display 106, game device 100 thus outputs to device display 106, the image based on the direction in which controller 200 is present with respect to game device 100.

(d2: Lay-Flat Mode)

An exemplary screen outputted in the lay-flat mode by game device 100 in system 1 according to the present embodiment will be described with reference to FIG. 12. In the standing mode shown in FIGS. 11A and 11B, the user is present in front of device display 106. In the lay-flat mode shown in FIG. 12, the user is present around device display 106.

Figure 12:
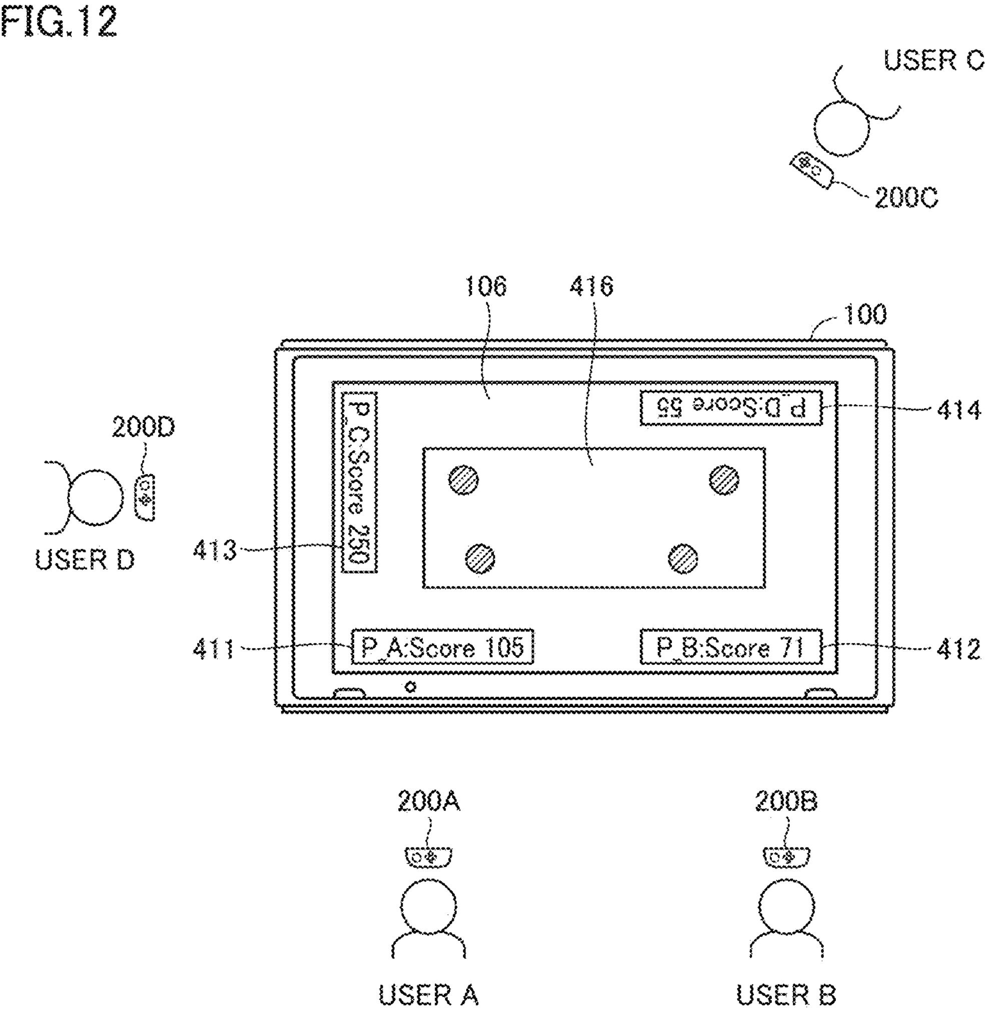
FIG. 12 shows an exemplary illustrative non-limiting drawing illustrating an exemplary screen outputted in a lay-flat mode by the game device in the system according to the present embodiment.

A case in which the users A to D are present around game device 100 and each user operates controller 200 to play a game is assumed in the example shown in FIG. 12.

Objects 411 to 414 indicating information for each user are shown on device display 106 in accordance with positions where the users A to D (controllers 200A to 200D) are present with respect to game device 100. More specifically, object 411 including information for the user A is arranged at a position corresponding to the direction in which controller 200A is present. Similarly, object 412 including information for the user B is arranged at a position corresponding to the direction in which controller 200B is present, object 413 including information for the user C is arranged at a position corresponding to the direction in which controller 200C is present, and object 414 including information for the user D is arranged at a position corresponding to the direction in which controller 200D is present.

Furthermore, each of objects 411 to 414 is shown in an orientation in which it is readily viewable from the direction in which the corresponding user (that is, controller 200) is present.

Whether or not the lay-flat mode has been set may be determined based on the result of detection by gyro sensor 132 of game device 100, or when application program 112 to be executed is premised on execution in the lay-flat mode, processing in the lay-flat mode may be performed regardless of the result of detection by gyro sensor 132.

When the image is outputted to device display 106, game device 100 thus outputs to device display 106, the image based on the direction in which controller 200 is present with respect to game device 100.

(d3: External Output Mode)

Figure 13A:
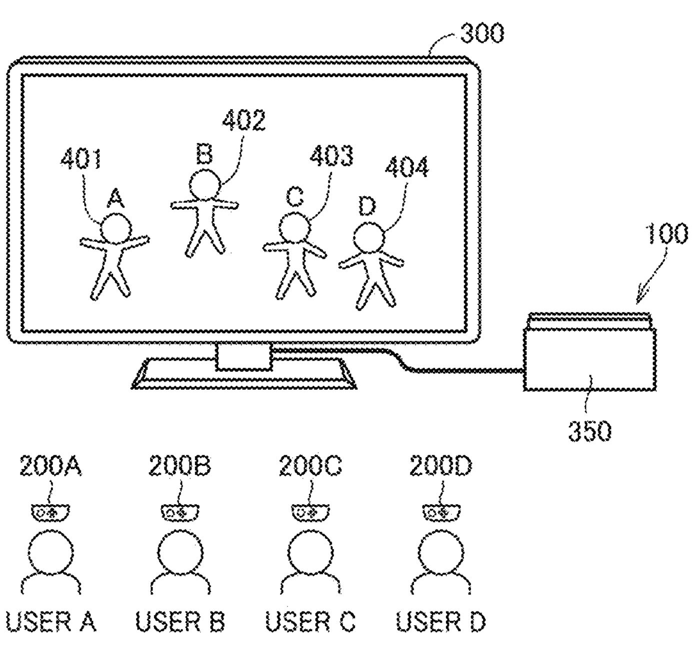
FIGS. 13A and 13B show exemplary illustrative non-limiting drawings illustrating an exemplary screen outputted in an external output mode by the game device in the system according to the present embodiment.
Figure 13B:
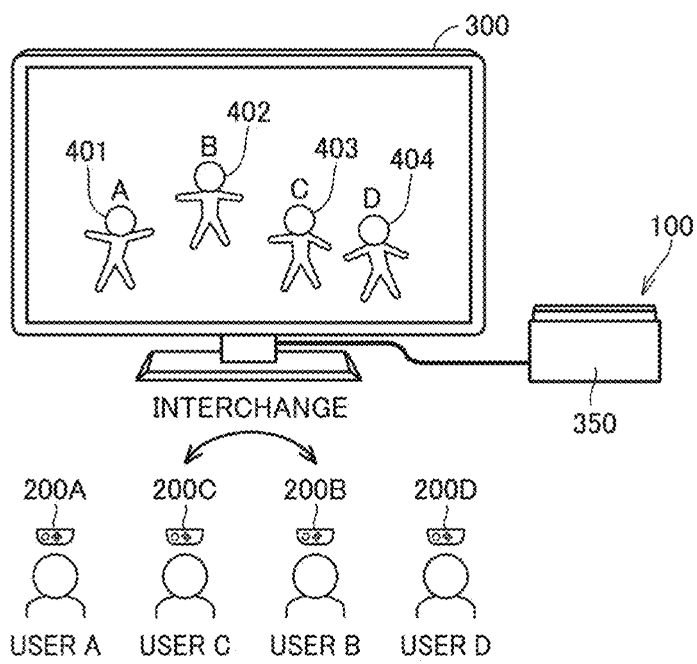

An exemplary screen outputted in the external output mode by game device 100 in system 1 according to the present embodiment will be described with reference to FIGS. 13A and 13B. In the standing mode and the lay-flat mode described above, the image is shown on device display 106 of game device 100. Since positional relation between device display 106 and antenna module 124 has been fixed, the position where controller 200 is present is reflected by generation of the image based on the measured direction.

In contrast, in the external output mode, the image is shown on external display 300 separate from device display 106. Therefore, even when the image based on the direction measured with antenna module 124 being defined as the reference is generated, the position where the user is present cannot necessarily appropriately be reflected.

Therefore, in the external output mode, generation of the image based on the measured direction may be restricted. Consequently, for example, as shown in FIGS. 13A and 13B, even when the position where the user (controller 200) is present changes, such change in position is not reflected in the image outputted to external display 300.

Processing for restricting generation of the image based on the measured direction may include processing for deactivating a part of processing or a function based on the direction, in addition to processing for refraining from reflecting the measured direction as described above. In other words, "restriction of generation of the image based on the measured direction" herein means deactivation of at least a part of any processing and function based on the measured direction which are performed in the standing mode or the lay-flat mode.

In this case, though direction measurement per se may be conducted, a measurement result may be discarded. Alternatively, direction measurement per se does not have to be conducted. Specifically, when the image is outputted to external display 300, direction measurement unit 122 of game device 100 may deactivate measurement of the direction in which controller 200 is present.

When a predetermined condition is satisfied even in the external output mode, however, generation of the image based on the measured direction does not have to be restricted. By way of example, when the predetermined condition is satisfied, restriction may be canceled. The predetermined condition includes, for example, a condition that positional relation between external display 300 and game device 100 (antenna module 124) is regarded as being similar to positional relation between device display 106 and antenna module 124.

Though game device 100 may determine with any method, whether or not the predetermined condition has been satisfied, information may be provided to the user such that the predetermined condition is satisfied. For example, when game device 100 and external display 300 being in predetermined positional relation is adopted as the predetermined condition for canceling restriction of generation of the image based on the direction measured in the external output mode, a screen that supports the user operation may be provided to realize the positional relation.

Whether or not the external output mode has been set may be determined based on a state of connection of cradle interface 138 of game device 100, or when application program 112 to be executed is premised on execution in the external output mode, processing in the external output mode may be performed regardless of the state of connection of cradle interface 138. Alternatively, processing associated with the external output mode may be performed in response to selection of the "external output mode" on game device 100 by the user.

Thus, when the image is outputted to external display 300, game device 100 may restrict generation of the image based on the measured direction.

(d4: Switching to External Output Mode)

In switching from the standing mode or the lay-flat mode to the external output mode, in the present embodiment, the user places game device 100 on cradle 350. At this time, the image generated based on the direction measured immediately before placement on cradle 350 may be kept used as it is (without the image being newly generated based on the measured direction after placement on cradle 350).

As the positional relation between game device 100 held by the user and controller 200 held by the user or controller 200 held by another user changes during movement of the user to the position of cradle 350 while the user carries game device 100, however, the image may be generated in a manner unintended by the user or another user. Therefore, when the previously generated image is kept used as it is also after game device 100 is placed on cradle 350, the user may feel uncomfortable or disoriented.

Then, in changing the mode from the standing mode or the lay-flat mode to the external output mode, the image may be generated in accordance with predetermined setting. For example, an object, a position of display or an attitude of which changes in accordance with the direction of controller 200, may be shown at a predetermined position or in a predetermined attitude in the external output mode. When change from the standing mode or the lay-flat mode to the external output mode is made, running application program 112 may temporarily be suspended.

An exemplary screen in switching to the external output mode, of game device 100 in system 1 according to the present embodiment will be described with reference to FIGS. 14 and 15. FIG. 14 shows an exemplary screen in the lay-flat mode and FIG. 15 shows an exemplary screen in the external output mode.

As shown in FIG. 14, in the lay-flat mode (or the standing mode), the image based on the measured direction is generated, and hence the positions and the attitudes of objects 411 to 414 are in accordance with the directions of controllers 200 with respect to game device 100.

Figure 15:
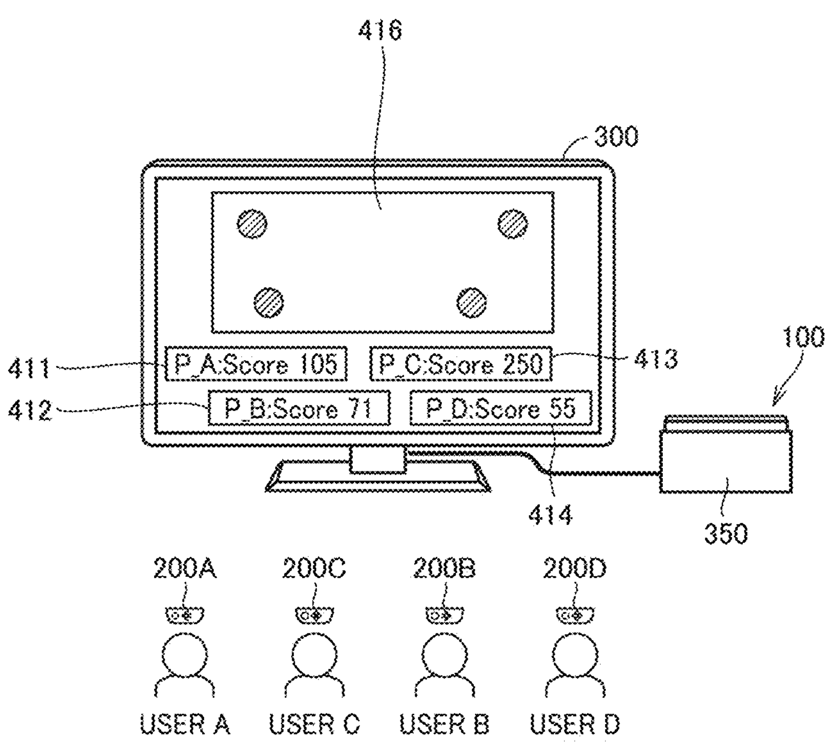

In contrast, when switching to the external output mode is made as shown in FIG. 15, generation of the image based on the measured direction is restricted, and hence the positions and the attitudes of objects 411 to 414 are in accordance with a predetermined setting or the like. Specifically, in the present embodiment, objects 411 to 414 corresponding to respective users are arranged in accordance with the order of registration of the users (the user A, the user B, the user C, and the user D in the example shown in FIG. 15) set before start of the game. Orientations in which objects 411 and 414 are shown are also aligned.

Thus, when game device 100 is switched from the state in which the image is outputted to device display 106 to the state in which the image is outputted to external display 300, it generates the image in accordance with predetermined setting independent of the measured direction.

When the predetermined condition as described above is satisfied in a state immediately after switching to the external output mode, however, restriction of generation of the image based on the measured direction may be canceled.

(d5: Switching from External Output Mode)

In switching from the external output mode to the standing mode or the lay-flat mode, restriction of generation of the image based on the measured direction may be canceled from immediately after mode switching. When change from the external output mode to the standing mode or the lay-flat mode is made, running application program 112 may temporarily be suspended.

Alternatively, some kind of a buffer period or a grace period may be provided. At this time, restriction of generation of the image based on the measured direction may be canceled only when any start condition is satisfied after switching from the external output mode to the standing mode or the lay-flat mode is made. Such a start condition includes examples such as those set forth below.

By way of example, after game device 100 is switched from the state in which the image is outputted to external display 300 to the state in which the image is outputted to device display 106, it may start generation of the image based on the measured direction after lapse of a predetermined time period since switching.

Alternatively, game device 100 may start generation of the image based on the measured direction when a motion of game device 100 is within a predetermined range after switching from the state in which the image is outputted to external display 300 to the state in which the image is outputted to device display 106 is made.

Alternatively, game device 100 may start generation of the image based on the measured direction when a temporal change in relative positional relation between game device 100 and controller 200 is within a predetermined range after switching from the state in which the image is outputted to external display 300 to the state in which the image is outputted to device display 106 is made.

For example, when the user takes game device 100 out of cradle 350 and places the game device on a table or the like, the direction of controller 200 may not appropriately be measured during a period of adjustment of the position where game device 100 is placed. Alternatively, there is also possibility that the user is adjusting a location of play while holding controller 200. If the image based on the measured direction is generated in such a situation, an image unintended by the user may be generated and the user may feel uncomfortable or disoriented. For example, by setting the start condition as above, an uncomfortable or disoriented feeling felt by the user may be lessened.

(d6: Generation of Image Based on Direction)

Generation of the image based on the direction herein includes processing for making a position of display or a direction of display (an orientation of display) or a manner of display (a color, decoration, or the like) of the object different based on the measured direction. For example, FIGS. 11A and 11B show an example in which the position of display of the object is made different based on the measured direction, and FIG. 12 shows an example in which the position of display and the direction of display of the object are made different based on the measured direction.

Generation of the image based on the direction may include processing for operating the object (e.g., player character) under a rule in accordance with the measured direction and processing for making interpretation of a user operation onto controller 200 different. For example, when the user A presses an up button of controller 200A in FIG. 12, game device 100 interprets the pressing as an instruction for an upward movement operation on the screen, whereas when the user D presses an up button of controller 200D, game device 100 interprets the pressing as an instruction for a right movement operation on the screen.

Thus, generation of the image based on the direction encompasses not only processing for causing significant change in image itself shown on device display 106 or external display 300 but also processing for causing significant change in method of generation of an image.

[E. Modification of Direction Measurement]

Some modifications of direction measurement will now be described.

(e1: Selection of Antenna Element in Accordance with Form of Use)

As described above, in system 1, there are some forms of use (for example, the three modes described above). In accordance with the form of use, at least one or all of antenna elements 125 included in antenna module 124 may be used. Specifically, direction measurement unit 122 of game device 100 may change an antenna element to be used for calculation of the direction in which controller 200 is present among the plurality of antenna elements 125, in accordance with at least one of the attitude of game device 100 and/or application program 112 to be executed.

Figure 16A:
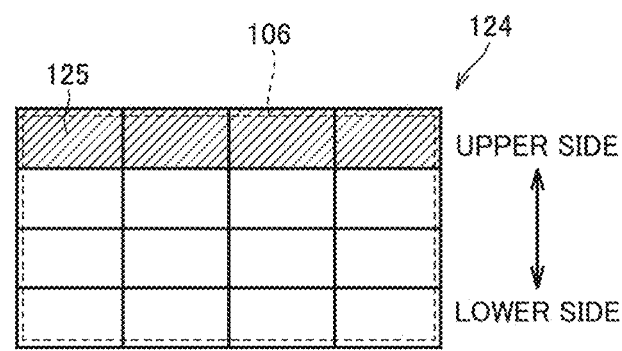
FIGS. 16A to 16C show exemplary illustrative non-limiting drawings illustrating an exemplary operation of the antenna module according to the present embodiment.
Figure 16B:
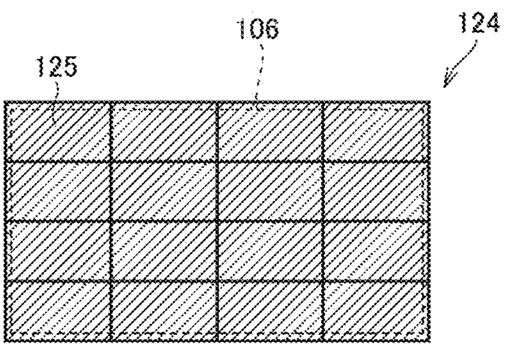

An exemplary operation of antenna module 124 in system 1 according to the present embodiment will be described with reference to FIGS. 16A to 16C. FIGS. 16A and 16B show an exemplary configuration including 4×4 antenna elements 125 as in antenna module 124 shown in FIG. 8. Antenna module 124 shown in FIGS. 16A to 16C may be arranged in parallel to the display surface of device display 106. Typically, antenna module 124 includes a plurality of antenna elements 125 including at least two antenna elements 125 for each direction, at least two antenna elements 125 being arranged along each of two directions (a vertical direction on the sheet plane and a lateral direction on the sheet plane in the example shown in FIGS. 16A and 16B) that define the display surface of device display 106.

FIG. 16A illustrates antenna element 125 to be used in the standing mode. Since the user is present in front of device display 106 in the standing mode, measurement of the direction of controller 200 in one dimension may suffice. Therefore, one row of antenna elements 125 among the plurality of antenna elements 125 included in antenna module 124 may be used.

At this time, since a bottom side of game device 100 is in proximity to the table or the like on which game device 100 is placed, a reflection component or the like may be included in the received wireless signal. Therefore, in using one row of antenna elements 125, upper antenna elements 125 may be used. One row of antenna elements 125, e.g., the uppermost row among the plurality of antenna elements, may be used as shown in FIG. 16A.

Thus, in at least one of a case where game device 100 is in such an attitude (a first attitude) that device display 106 is placed as being orientated laterally or obliquely upward and/or a case where application program 112 is programmed to operate according to the attitude is running (that is, in the standing mode), direction measurement unit 122 of game device 100 uses at least one of antenna element 125 among the plurality of antenna elements 125.

FIG. 16B illustrates antenna element 125 to be used in the lay-flat mode. In the lay-flat mode, the user is present around device display 106. Therefore, the direction of controller 200 may desirably be measured in two dimensions. Specifically, all of antenna elements 125 included in antenna module 124 may be used as shown in FIG. 16B.

Thus, in at least one of a case where game device 100 is in such an attitude (a second attitude) that device display 106 is placed as facing up and/or a case where application program 112 is programmed to operate according to the attitude is running (that is, in the lay-flat mode), direction measurement unit 122 of game device 100 uses all of the plurality of antenna elements 125.

Figure 16C:
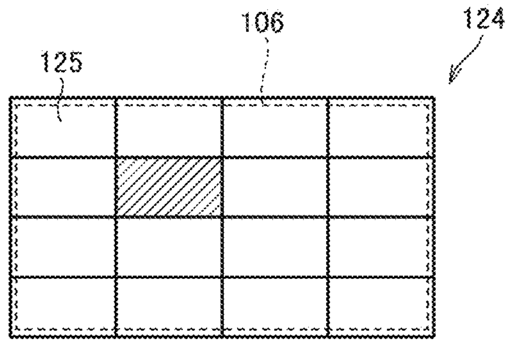

FIG. 16C illustrates antenna element 125 to be used in the external output mode. In the external output mode, basically, generation and display of the image based on the measured direction is restricted. Therefore, use of a single antenna element 125 included in antenna module 124 will suffice. In other words, antenna element 125 does not have to successively be selected.

When restriction of generation and display of the image based on the measured direction is canceled, however, a plurality of antenna elements 125 may be used also in the external output mode. By way of example, as shown in FIG. 16A, one row of antenna elements 125 may be used.

Though antenna elements 125 are arranged along each of two directions that define the display surface of device display 106 in the present embodiment, two or more antenna elements 125 may be provided in different manner of alignment in detection of the direction with a method as in the present embodiment.

(e2: Selection of Antenna Element in Accordance with Position Where Controller Is Present)

After the direction in which controller 200 is present is measured, direction measurement unit 122 of game device 100 may use only antenna element 125 suitable for measurement of the direction to repeat measurement of the direction. Specifically, direction measurement unit 122 of game device 100 may change antenna element 125 to be used for calculation of the direction in which controller 200 is present among the plurality of antenna elements 125, in accordance with the previously measured direction in which controller 200 is present. Thus, it will be appreciated that certain example embodiments may provide adaptive or dynamic antenna element selection.

For example, in the lay-flat mode, in accordance with a measurement result that controller 200 is present in the vicinity of any side of device display 106, only antenna element 125 suitable for measurement of the direction in which controller 200 is present may be used.

(e3: Change in Frequency of Measurement in Accordance with Behavior of Controller)

After measurement unit 122 of game device 100 measures the direction in which controller 200 is present, it may optimize a frequency of measurement in accordance with a measurement result. Specifically, direction measurement unit 122 of game device 100 may change the frequency of calculation of the direction in which controller 200 is present, in accordance with the previously measured direction in which controller 200 is present.

For example, when controller 200 is present at a position relatively distant from game device 100, an amount of temporal change in direction of controller 200 with respect to game device 100 is relatively small, and hence the frequency of measurement can be lowered.

Alternatively, direction measurement unit 122 of game device 100 may change the frequency of measurement in accordance with a degree of temporal change in measured direction. For example, when a change in measurement result is within a predetermined range as a result of a plurality of times of direction measurement within a predetermined period, movement of controller 200 may be regarded as being relatively small and the frequency of measurement may be made lower than a reference value. In contrast, when a change in measurement result exceeds the predetermined range, movement of controller 200 may be regarded as being relatively large and the frequency of measurement may be made higher than the reference value.

By adjusting the frequency of measurement in accordance with the behavior of controller 200, an increase in processing load of game device 100 can be suppressed and reduction in power consumption or the like can also be expected.

(e4: Others)

Regardless of whether the lay-flat mode or the standing mode is set, that is, regardless of the attitude of game device 100 or the running application program, a constant number of antenna elements 125 (for example, all antenna elements 125) may always be used.

[F. Processing Procedure]

An exemplary procedure of processing performed by system 1 according to the present embodiment will now be described.

A procedure of processing performed by game device 100 in system 1 according to the present embodiment will be described with reference to FIG. 17. Each step shown in FIG. 17 is typically performed by execution of application program 112 by processor 102 of game device 100.

Referring to FIG. 17, game device 100 determines whether or not running application program 112 is configured to generate the image based on the direction (step S100). When the game device is not configured to generate the image based on the direction (NO in step S100), game device 100 does not conduct direction measurement of controller 200 but generates the image in accordance with predetermined setting (step S102). The generated image is outputted to device display 106 or external display 300.

Game device 100 determines whether or not end of the application program has been indicated (step S104). When end of the application program has not been indicated (NO in step S104), processing in step S102 or later is repeated. When end of the application program has been indicated (YES in step S104), the process ends.

When the game device is configured to generate the image based on the direction (YES in step S100), it determines the current form of use (step S106). For determination of the form of use, whether or not the game device is electrically connected to cradle 350 with cradle interface 138 being interposed, a result of detection of the attitude by gyro sensor 132, or the like is used. Alternatively, for determination of the form of use, a type, setting, or the like of running application program 112 may be used.

When the current form of use is the "portable mode" ("portable mode" in step S106), processing in step S102 or later is performed.

When the current form of use is the "standing mode" ("standing mode" in step S106), game device 100 determines one row of antenna elements 125 located uppermost and included in antenna module 124 as antenna elements to be used (step S108).

Game device 100 determines whether or not running application program 112 requests generation of the image based on the direction (step S110). When running application program 112 requests generation of the image based on the direction (YES in step S110), game device 100 measures the direction of controller 200 (step S112). Game device 100 then generates the image based on the measured direction for each controller 200 (step S114). The generated image is outputted to device display 106 or external display 300 in accordance with the current form of use.

When running application program 112 does not request generation of the image based on the direction (NO in step S110), processing in steps S112 and S114 is skipped.

In succession, game device 100 determines whether or not the form of use has been changed (step S116). When the form of use has been changed (YES in step S116), processing in step S106 or later is performed.

When the form of use has not been changed (NO in step S116), game device 100 determines whether or not end of the application program has been indicated (step S118). When end of the application program has not been indicated (NO in step S118), processing in step S110 or later is repeated. When end of the application program has been indicated (YES in step S118), the process ends.

When the current form of use is the "lay-flat mode" ("lay-flat mode" in step S106), game device 100 determines all antenna elements 125 included in antenna module 124 as antenna elements to be used (step S120). The game device then performs processing in step S110 or later.

When the current form of use is the "external output mode" ("external output mode" in step S106), game device 100 determines whether or not the predetermined condition for cancellation of restriction of generation of the image based on the measured direction has been satisfied (step S122). When the predetermined condition for cancellation of restriction of generation of the image based on the measured direction has been satisfied (YES in step S122), the game device performs processing in step S120 or later. Instead of the processing in step S120 or later, processing in step S108 or later may be performed. Alternatively, a specific antenna element suitable when the restriction is canceled in the external output mode may be determined as the antenna element to be used.

When the predetermined condition for cancellation of restriction of generation of the image based on the measured direction has not been satisfied (NO in step S122), game device 100 does not measure the direction of controller 200 but generates the image in accordance with the predetermined setting (step S124). The generated image is outputted to external display 300.

In succession, game device 100 determines whether or not the form of use has been changed (step S126). When the form of use has been changed (YES in step S126), processing in step S106 or later is performed.

When the form of use has not been changed (NO in step S126), game device 100 determines whether or not end of the application program has been indicated (step S128). When end of the application program has not been indicated (NO in step S128), processing in step S124 or later is repeated. When end of the application program has been indicated (YES in step S128), the process ends.

Figure 18:
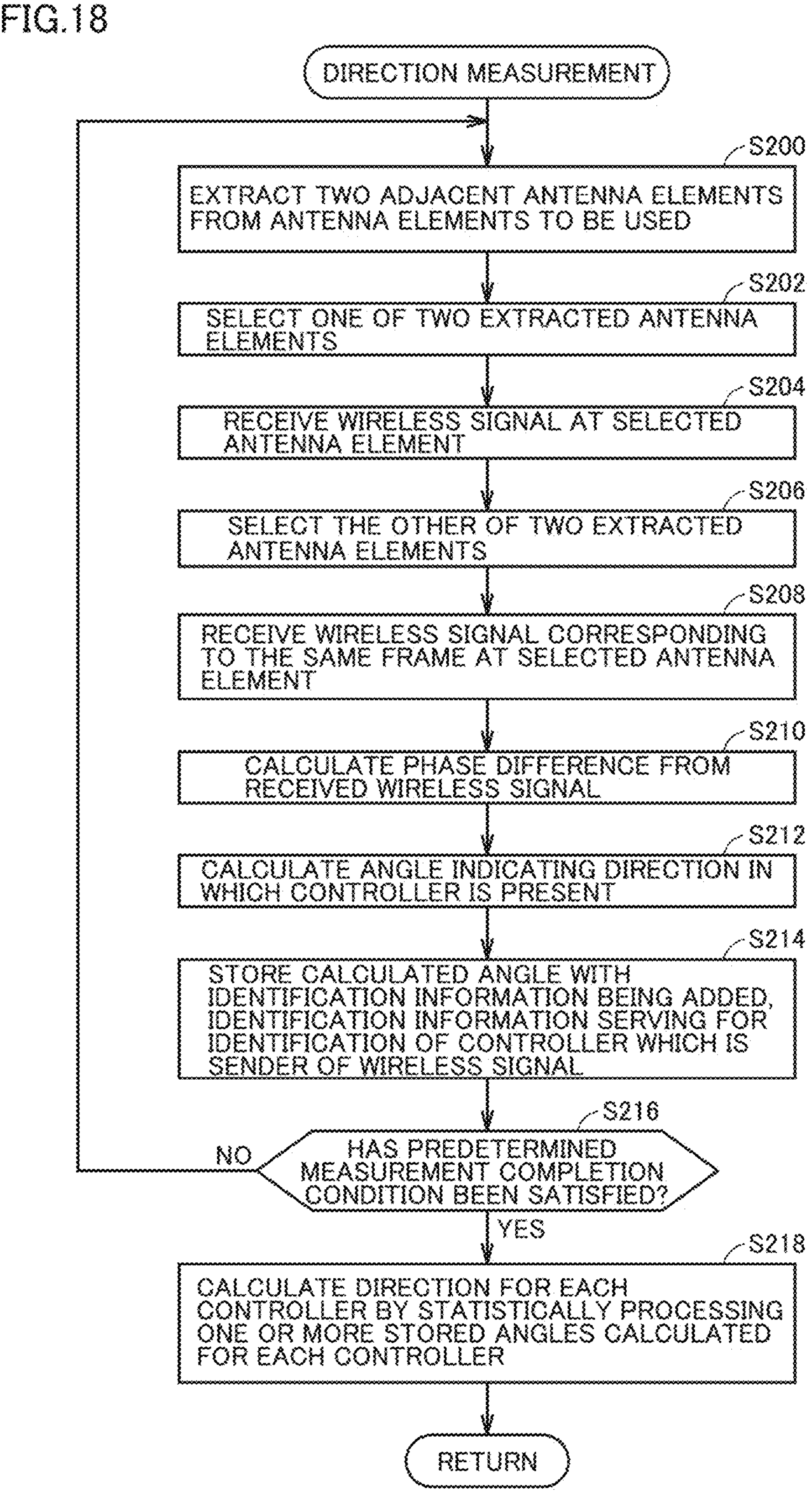
FIG. 18 shows an exemplary illustrative non-limiting drawing illustrating a flowchart showing a procedure of processing in direction measurement shown in FIG. 17.

A procedure of processing in direction measurement shown in FIG. 17 will be described with reference to FIG. 18. Game device 100 extracts two adjacent antenna elements 125 among antenna elements 125 to be used (step S200). Game device 100 selects one of two extracted antenna elements 125 (step S202) and receives the wireless signal at selected antenna element 125 (step S204). In succession, game device 100 selects the other of two extracted antenna elements 125 (step S206) and receives the wireless signal corresponding to the same frame at selected antenna element 125 (step S208).

Game device 100 then calculates the phase difference between the wireless signal received in step S204 and the wireless signal received in step S208 (step S210) and calculates an angle indicating the direction in which controller 200 is present based on the calculated phase difference (step S212). Furthermore, game device 100 adds to the angle, identification information for identifying controller 200 which is the sender of the wireless signal received at two antenna elements 125, and has the calculated angle stored (step S214).

Game device 100 determines whether or not a predetermined measurement completion condition has been satisfied (step S216). The predetermined measurement completion condition includes such a condition as measurement over a predetermined time period and a predetermined number of times of measurement.

When the predetermined measurement completion condition has not been satisfied (NO in step S216), processing in step S200 or later is repeated.

When the predetermined measurement completion condition has been satisfied (YES in step S216), game device 100 calculates the direction for each controller 200 by statistically processing one or more stored angles calculated for each controller 200 (step S218). The process then returns.

[G. Other Forms]

Though the example in which processor 102 of game device 100 is responsible for processing for generating the image in accordance with the user operation onto controller 200 is described above, the processing for generating the image may use a computing resource other than game device 100. Typically, a computing resource on a cloud that can communicate with game device 100 may generate the image. In this case, game device 100 transmits a signal indicating the user operation received from controller 200 and information indicating the direction of controller 200 to the computing resource, and receives the image from the computing resource and outputs the image to device display 106 or external display 300. Furthermore, rather than the computing resource on the cloud, any computing resource that can communicate over a local network may be used.

Though the example in which the direction of controller 200 is measured with the use of the wireless signal transmitted from controller 200 is described above, the direction may be measured with another method. For example, infrared rays or ultrasound may be used.

In another example, initial positions of one or more of the controllers 200A to 200D may be known or determined in connection with an initial arrangement. Thereafter, the positioning of one or more of the controllers 200A to 200D relative to the display 106 and/or external display 300 may be changed. The change may be in accordance with prescribed movements of the users using the controllers 200A to 200D. For example, the users using controllers 200A and 200B may be told to change positions. After a prescribed waiting time, the positions may simply be assumed to be moved, and/or the move may be confirmed. As another example, rather than users being told to exchange positions, the users may be told to move to prescribed positions in a room. The prescribed positions in the room may be certain distances from where they are initially (e.g., move left 1 foot and back 2 feet, for example) and/or certain distances from where the display 106 and/or external display 300 is/are (e.g., move 5 feet back from and 1 foot to the left of the display 106). As another example, the prescribed positions in the room may be set in advance (e.g., through a calibration procedure), and they be marked or unmarked. As still another example, the prescribed positions in the room may be determined in connection with a piece of furniture or other landmark (e.g., move in behind the coffee table or move to the back left corner of the room).

Rather than the configuration in which game device 100 receives the wireless signal transmitted from controller 200 and measures the direction, a configuration in which controller 200 receives the wireless signal transmitted from game device 100 and measures the direction may be adopted. In this case, by transmission of information indicating the direction measured by controller 200 to game device 100, information on the direction can be reflected on generation of the image in game device 100.

In the description above, the standing mode and the lay-flat mode are exemplified as the modes in which the direction in which controller 200 is present is used while device display 106 of game device 100 is used. Only a single mode, however, may be implemented (any one of the standing mode and the lay-flat mode may be implemented or a mode different therefrom may be implemented), or three or more modes may be implemented. When only the single mode is implemented, all antenna elements may be used in that mode to measure the direction in which controller 200 is present.

In the description above, processing is performed in accordance with the standing mode or the lay-flat mode determined in accordance with application program 112. When application program 112 includes a plurality of sub applications (for example, mini games), however, the mode may be determined not only for the entire application program 112 but also for each sub application.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A system comprising:

a portable electronic device comprising a device display and an interface configured to connect the portable electronic device to an external display separate from the device display;

a user-operable controller; and one or more memories storing instructions that, when executed, cause one or more processors of the system to perform operations comprising:

generating an image in accordance with a user operation provided via the controller, wherein when the image is to be output to the device display, the image is generated based on a direction in which the controller is present with respect to the portable electronic device, and wherein when the image is to be output to the external display, the image is generated without regard to the direction in which the controller is present with respect to the portable electronic device.

2. The system according to claim 1, wherein:

the controller is configured to transmit a wireless signal, and calculation of the direction in which the controller is present is based on a phase difference caused when a plurality of antenna elements arranged at distant positions receive the wireless signal.

3. The system according to claim 2, wherein the direction in which the controller is present is not obtained when the image is to be output to the external display.

4. The system according to claim 2, wherein the image is generated based on a direction in which the controller is present with respect to the portable electronic device even when the image is to be output to the external display, provided that a condition is satisfied.

5. The system according to claim 2, wherein at least one of the antenna elements used in the calculation of the direction in which the controller is present among the plurality of antenna elements is changed in accordance with an attitude of the portable electronic device and/or an application program executed by the one or more processors.

6. The system according to claim 2, wherein at least one antenna element of the plurality of antenna elements is used in the calculation in a first case in which the device display is in a first attitude in which the device display is placed so as to be laterally oriented or orientated obliquely upward, and in a second case in which an application program executed by the one or more processors is programmed to operate according to the first attitude is running.

7. The system according to claim 2, wherein all of the plurality of antenna elements are used in the calculation in a first case in which the device display is in a second attitude in which the display is placed so as to be facing up, and in a second case in which an application program executed by the one or more processors is programmed to operate according to the second attitude is running.

8. The system according to claim 6, wherein:

the plurality of antenna elements comprise at least two antenna elements for each direction, the at least two antenna elements being arranged along each of two directions defining a display surface of the device display, and the at least one antenna element to be used is a row of antenna elements among the plurality of antenna elements.

9. The system according to claim 8, wherein the row of antenna elements is an uppermost row of antenna elements among the plurality of antenna elements.

10. The system according to claim 5, wherein the at least one antenna element to be used in the calculation is changed in accordance with a previously obtained direction in which the controller was present.

11. The system according to claim 1, wherein a frequency of calculation of the direction in which the controller is present is changed in accordance with a previously obtained direction in which the controller was present.

12. The system according to claim 1, wherein the image is generated in accordance with a setting independently of the direction when switching from a state in which the image is to be output to the device display to a state in which the image is to be output to the external display.

13. The system according to claim 1, wherein the image is generated based on the direction after a predetermined time has elapsed from switching from a state in which the image is to be output to the external display to a state in which the image is to be output to the device display.

14. The system according to claim 1, wherein image is generated based on the direction when a motion of the portable electronic device is within a predetermined range after switching from a state in which the image is to be output to the external display to a state in which the image is to be output to the device display.

15. The system according to claim 1, wherein the image is generated based on the direction when a temporal change in relative positional relation between the portable electronic device and the controller is within a predetermined range after switching from a state in which the image is to be output to the external display to a state in which the image is to be output to the device display.

16. A portable electronic device configured to communicate with a user-operable controller, the portable electronic device comprising:

a device display;

an interface configured to connect the portable electric device an external display separate from the device display;

one or more memories configured to store instructions that, when executed, cause one or more processors of the portable electronic device to perform operations comprising:

generating an image in accordance with a user operation provided via the controller, wherein when the image is to be output to the device display, the image is generated based on a direction in which the controller is present with respect to the portable electronic device, and wherein when the image is to be output to the external display, the image is generated without regard to the direction in which the controller is present with respect to the portable electronic device.

17. A processing method performed by a portable electronic device comprising a device display and an interface configured to connect the portable electronic device to an external display separate from the device display, the processing method comprising:

communicating with a user-operable controller; and generating an image in accordance with a user operation provided via the controller, wherein:

when the image is to be output to the device display, the image is generated based on a direction in which the controller is present with respect to the portable electronic device, and when the image is to be output to the external display, the image is generated without regard to the direction in which the controller is present with respect to the portable electronic device.

18. A non-transitory computer-readable storage medium having instructions stored thereon which, when executed, cause one or more processors of a portable electronic device to perform operations comprising:

communicating with a user-operable controller; and generating an image in accordance with a user operation provided via the controller, wherein when the image is to be output to a device display of the portable electronic device, the image is generated based on a direction in which the controller is present with respect to the portable electronic device, and when the image is to be output to an external display separate from the device display, the image is generated without regard to the direction in which the controller is present with respect to the portable electronic device.

* * * * *